(12) United States Patent
Bierdel et al.

(10) Patent No.: US 9,688,002 B2
(45) Date of Patent: Jun. 27, 2017

(54) SCREW ELEMENTS WITH IMPROVED DISPERSING ACTION AND LOW ENERGY INPUT

(75) Inventors: Michael Bierdel, Leverkusen (DE); Thomas König, Leverkusen (DE); Ulrich Liesenfelder, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 1040 days.

(21) Appl. No.: 12/997,940

(22) PCT Filed: Jun. 6, 2009

(86) PCT No.: PCT/EP2009/004083
§ 371 (c)(1),
(2), (4) Date: Mar. 16, 2011

(87) PCT Pub. No.: WO2009/152968
PCT Pub. Date: Dec. 23, 2009

(65) Prior Publication Data
US 2011/0158039 A1    Jun. 30, 2011

(30) Foreign Application Priority Data

Jun. 20, 2008 (DE) .................. 10 2008 029 303

(51) Int. Cl.
*B29B 7/48* (2006.01)
*B29C 47/08* (2006.01)
(Continued)

(52) U.S. Cl.
CPC .............. *B29B 7/489* (2013.01); *B29B 7/481* (2013.01); *B29B 7/483* (2013.01); *B29B 7/484* (2013.01); *B29C 47/0844* (2013.01); *B29C 47/0861* (2013.01); *B29C 47/0881* (2013.01); *B29C 47/38* (2013.01); *B29C 47/402* (2013.01);
(Continued)

(58) Field of Classification Search
CPC ............ B29C 47/6043; B29C 47/6056; B29C 47/6062; B29C 47/0844; B29C 47/0861; B29C 47/38; B29C 47/402; B29B 7/489; B29B 7/481; B29B 7/483; B29B 7/484
USPC ........ 366/82, 85, 301, 97, 79; 425/204, 208, 425/209
See application file for complete search history.

(56) References Cited

U.S. PATENT DOCUMENTS 3,195,868 A    7/1965  Loomans et al.
3,900,187 A *  8/1975  Loomans ................ B29B 7/489
                                                          366/85

(Continued)

FOREIGN PATENT DOCUMENTS

DE        862668 C       1/1953
EP      0160124 A2      11/1985
(Continued)

OTHER PUBLICATIONS

International Search Report dated Sep. 17, 2009.
(Continued)

*Primary Examiner* — Walter D Griffin
*Assistant Examiner* — Marc C Howell
(74) *Attorney, Agent, or Firm* — K&L Gates LLP

(57) ABSTRACT

The present invention relates to new screw elements for multi-screw extruders with pairs of co-rotating and fully wiping screws.

25 Claims, 16 Drawing Sheets

(51) Int. Cl.
*B29C 47/38* (2006.01)
*B29C 47/40* (2006.01)
*B29C 47/60* (2006.01)
*B29C 47/62* (2006.01)
*B29C 47/00* (2006.01)

(52) U.S. Cl.
CPC .......... *B29C 47/6056* (2013.01); *B29C 47/62* (2013.01); *B29C 47/625* (2013.01); *B29C 47/0009* (2013.01)

(56) References Cited

U.S. PATENT DOCUMENTS

| | | | |
|---|---|---|---|
| 4,534,652 | A | 8/1985 | Stade |
| 4,824,256 | A | 4/1989 | Haring et al. |
| 5,044,757 | A * | 9/1991 | Dienst .......................... 366/76.6 |
| 5,304,000 | A * | 4/1994 | Kowalczyk et al. ........... 366/97 |
| 5,593,227 | A * | 1/1997 | Scheuring et al. ............. 366/82 |
| 5,806,975 | A | 9/1998 | Hosokawa et al. |
| 5,816,697 | A | 10/1998 | Nogata et al. |
| 6,699,416 | B2 | 3/2004 | Tadros |
| 6,783,270 | B1 * | 8/2004 | Padmanabhan ................ 366/82 |
| 2007/0211560 | A1 | 9/2007 | Takamoto et al. |
| 2007/0222105 | A1 * | 9/2007 | Brown ............... B29C 47/0019 264/211 |

FOREIGN PATENT DOCUMENTS

| | | |
|---|---|---|
| EP | 0771629 A1 | 5/1997 |
| EP | 0778078 A1 | 11/1997 |
| EP | 0931640 A1 | 7/1999 |
| EP | 1093905 A2 | 4/2001 |
| EP | 1832407 A1 | 9/2007 |
| SU | 1279522 A3 | 12/1986 |
| SU | 1634511 A2 | 3/1991 |
| WO | 95/33608 | 12/1995 |

OTHER PUBLICATIONS

Multiphase Flow in Polymer Processing; Chang Dae Han; Department of Chemical Engineering. Polytechnic Institute of New York; Academic Press New York 1981ohlgr; pp. 250-255.

Klemens Kohlgruber; Co-Rotating Twin-Screw Extruders; Fundamentals, Technology, and Applications; Cael Hanser Publishers; Munich; 2007.

International Search Report dated Sep. 8, 2009.

Klemens Kohlgruber, et al., Co-Rotating Twin-Screw Extruders: Fundamentals, Technology, and Applications, Hanser Gardner Publications, Chapter 5.2, pp. 92-94 (2007).

Klemens Kohlgruber, et al., Co-Rotating Twin-Screw Extruders: Fundamentals, Technology, and Applications, Hanser Gardner Publications, Chapter 5.8, pp. 103-104 (2007).

Klemens Kohlgruber, et al., Co-Rotating Twin-Screw Extruders: Fundamentals, Technology, and Applications, Hanser Gardner Publications, Chapter 12, pp. 215-235 (2007).

* cited by examiner

1) R = 0.3069  Mx = 0.2731
   α = 0.7854  My = 0.0000
1') R = 0.6931  Mx = 0.0000
    α = 0.7854  My = -0.2731

1) R = 0.2199  Mx = 0.3234
   α = 0.5236  My = 0.0000
1') R = 0.7801  Mx = -0.1617
   α = 0.5236  My = -0.2801

1) $R = 0.0625$ $M_x = 0.5208$
   $\alpha = 0.1745$ $M_y = 0.0000$

2) $R = 0.9375$ $M_x = -0.3409$
   $\alpha = 0.2803$ $M_y = -0.1519$

3) $R = 0.0625$ $M_x = 0.4452$
   $\alpha = 0.5822$ $M_y = 0.2325$

4) $R = 0.9375$ $M_x = 0.0000$
   $\alpha = 0.5337$ $M_y = -0.5208$

5) $R = 0.9375$ $M_x = 0.0000$
   $\alpha = 0.1745$ $M_y = -0.5208$

6) $R = 0.0625$ $M_x = -0.1519$
   $\alpha = 0.2803$ $M_y = 0.3409$

7) $R = 0.9375$ $M_x = 0.2325$
   $\alpha = 0.5822$ $M_y = -0.4452$

8) $R = 0.0625$ $M_x = -0.5208$
   $\alpha = 0.5337$ $M_y = -0.0000$

9) $R = 0.0625$ $M_x = -0.5208$
   $\alpha = 0.1745$ $M_y = -0.0000$

10) $R = 0.9375$ $M_x = 0.3409$
    $\alpha = 0.2803$ $M_y = 0.1519$

11) $R = 0.0625$ $M_x = -0.4452$
    $\alpha = 0.5822$ $M_y = -0.2325$

12) $R = 0.9375$ $M_x = -0.0000$
    $\alpha = 0.5337$ $M_y = 0.5208$

13) $R = 0.9375$ $M_x = -0.0000$
    $\alpha = 0.1745$ $M_y = 0.5208$

14) $R = 0.0625$ $M_x = 0.1519$
    $\alpha = 0.2803$ $M_y = -0.3409$

15) $R = 0.9375$ $M_x = -0.2325$
    $\alpha = 0.5822$ $M_y = 0.4451$

16) $R = 0.0625$ $M_x = 0.5208$
    $\alpha = 0.5337$ $M_y = -0.0000$

1') $R = 0.9375$ $M_x = 1.5208$
    $\alpha = 0.1745$ $M_y = -0.0000$

2') $R = 0.0625$ $M_x = 0.6591$
    $\alpha = 0.2803$ $M_y = -0.1519$

3') $R = 0.9375$ $M_x = 1.4452$
    $\alpha = 0.5822$ $M_y = 0.2325$

4') $R = 0.0625$ $M_x = 1.0000$
    $\alpha = 0.5337$ $M_y = -0.5208$

5') $R = 0.0625$ $M_x = 1.0000$
    $\alpha = 0.1745$ $M_y = -0.5208$

6') $R = 0.9375$ $M_x = 0.8481$
    $\alpha = 0.2803$ $M_y = 0.3409$

7') $R = 0.0625$ $M_x = 1.2325$
    $\alpha = 0.5822$ $M_y = -0.4452$

8') $R = 0.9375$ $M_x = 0.4792$
    $\alpha = 0.5337$ $M_y = -0.0000$

9') $R = 0.9375$ $M_x = 0.4792$
    $\alpha = 0.1745$ $M_y = -0.0000$

10') $R = 0.0625$ $M_x = 1.3409$
     $\alpha = 0.2803$ $M_y = 0.1519$

11') $R = 0.9375$ $M_x = 0.5548$
     $\alpha = 0.5822$ $M_y = -0.2325$

12') $R = 0.0625$ $M_x = 1.0000$
     $\alpha = 0.5337$ $M_y = 0.5208$

13') $R = 0.0625$ $M_x = 1.0000$
     $\alpha = 0.1745$ $M_y = 0.5208$

14') $R = 0.9375$ $M_x = 1.1519$
     $\alpha = 0.2803$ $M_y = -0.3409$

15') $R = 0.0625$ $M_x = 0.7675$
     $\alpha = 0.5822$ $M_y = 0.4451$

16') $R = 0.9375$ $M_x = 1.5208$
     $\alpha = 0.5337$ $M_y = -0.0000$

Fig. 13b

SCREW ELEMENTS WITH IMPROVED DISPERSING ACTION AND LOW ENERGY INPUT

This is an application filed under 35 USC §371 of PCT/EP2009/004083, claiming priority to DE 10 2008 029 303.2 filed on Jun. 20, 2008.

BACKGROUND OF THE INVENTION (1) Field of the Invention

The present invention relates to screw elements for multi-screw extruders with pairs of co-rotating and fully wiping screws, to the use of these screw elements in multi-screw extruders and to a method of generating these screw elements.

(2) Description of Related Art

Co-rotating twin- or multi-screw extruders whose rotors fully wipe each other have been known for a long time (see, for example, German Patent No. 862,668). Screw extruders based on the principle of fully wiping profiles are used for many diverse applications in the field of polymer production and processing. This is mainly due to the fact that polymer melts adhere to surfaces and are degraded over time at the processing temperatures commonly employed. This is prevented by the self-cleaning effect of fully wiping screws. Rules for generating fully wiping screw profiles are described for example in *Klemens Kohlgrüber: Der gleichläufige Doppelschneckenextruder* ("*The co-rotating twin-screw extruder*"), Publishers: Hanser Verlag, Munich, 2007, pp. 96 et seq.), in which it is also stated that a predefined screw profile on the 1st shaft of a twin-screw extruder determines the screw profile on the 2nd shaft of a twin-screw extruder. The screw profile on the first shaft of the twin-screw extruder is therefore referred to as the generating screw profile. The screw profile on the 2nd shaft of the twin-screw extruder is based on the screw profile on the 1st shaft of the twin-screw extruder and is therefore referred to as the generated screw profile. In multi-screw extruders the generating screw profile and the generated screw profile are always arranged alternately.

Modern twin-screw extruders consist of a modular system in which various screw elements can be mounted onto a central shaft. This allows those skilled in the art to adjust twin-screw extruders to suit the processing task concerned.

The screw elements known according to the prior art are—with the exception of eccentrically arranged circular discs—characterized in that the cross-sectional profile contour has at least one bend (see, for example, FIG. 1) occurring at the transition between the screw tip and the flight flanks. The tip consists of an arc with a radius equal to the outer diameter of the profile and a centre point at the point of rotation of the profile. The bend at the transition to the flank of the profile forms a crest on the screw element.

One of the main processes performed in multi-screw extruders is the dispersion of liquid phases or melts which cannot be homogeneously mixed with each other or the dispersion of solids in polymer melts. It is known from the technical literature (see, for example, Chang Dae Han: Multiphase Flow in Polymer Processing, Academic Press, New York 1981), that a combination of shear and elongational flow is the best method of solving difficult dispersion problems.

Such a type of flow prevails in a screw channel in which the material is not only sheared by the rotation of the screws but is also simultaneously elongated by the convergence of the screw channel towards the tip. In the region of the screw tip only shear flow does however prevail, which is hardly conducive to solving difficult dispersion problems. On the other hand, most of the energy introduced is dissipated in the gap between the screw tip and the barrel and between the screw tip and the adjacent screw, which is why this region plays a major role in the heating of and thus in potentially thermally damaging the polymer composition, without making any contribution to the processing task of dispersion.

Eccentrically arranged circular discs, which are known to be capable of being arranged in a fully wiping fashion, are an exception. They do not have a tip region exclusively producing shear flow. They are well-known for their excellent dispersing action, although they also create a high input of energy since they form a very narrow gap over a large circumferential region. They are also restricted to a flight number Z of 1.

Based on the prior art, the problem therefore arose of providing screw elements for multi-screw extruder machines which have improved dispersing action compared to the prior art and require only a low input of energy.

Surprisingly it has been found that this problem is solved by screw elements whose profile contours are continuously differentiable over their entire cross-sections.

BRIEF SUMMARY OF THE INVENTION

The present invention therefore relates to screw elements for multi-screw extruders with pairs of co-rotating, fully wiping extruder screws with two or more flights, characterized in that the generating and the generated screw profiles have continuously differentiable profile contours over their entire cross-sections.

The present invention is not limited to screw elements with a modular design of the type commonly used today with a screw consisting of separate elements and central shafts, but it can also be used for screws designed in one piece. Screw elements therefore also refer to screws designed as integrated wholes.

The cross-sectional profiles—hereinafter also referred to briefly as profiles or screw profiles—of screw elements according to the invention can be precisely defined by an arrangement of arcs.

The entire screw profiles of generating and generated screw elements according to the invention consists of n arcs, n being an integer greater than or equal to four. Each of the n arcs has a starting and an end point. The n arcs merge tangentially into each other at their starting and end points, thereby forming continuously differentiable profile contours according to the invention.

The position of each arc j (j=1 to n) is precisely definable by fixing two different points. Appropriately the position of an arc is determined by fixing its centre point and its starting or end point. The size of an individual arc j is determined by its radius $r_j$ and the angle $\alpha_j$ around the centre point between the starting and end points, the radius $r_j$ being larger than or equal to 0 and smaller than the centre distance a between the screws and angle $\alpha_j$ being, in terms of radian measurement, greater than or equal to 0 and smaller than or equal to $2\pi$, wherein $\pi$ is pi.

Screw elements according to the invention are characterized in that the generating screw profile and the generated screw profile lie in the same plane, the axis of rotation of the generating screw profile and the axis of rotation of the generated screw profile are each positioned vertically, at a distance a (the centre distance) from each other, to the plane of the screw profiles, the point of intersection between the axis of rotation of the generating screw profile and said plane being referred to as the point of rotation of the generating screw profile and the point of intersection between the axis of rotation of the generated screw profile and said plane being referred to as the point of rotation of the generated screw profile, the number of arcs n forming the entire generating screw profile is greater than or equal to four (n≥4), the outer radius ra of the generating screw profile is greater than zero (ra>0) and smaller than the distance between the axes (the centre distance) (ra<a), the inner radius ri of the generating screw profile is greater than zero (ri>0) and smaller than or equal to ra (ri≤ra), all of the arcs of the generating screw profile merge tangentially into each other, the arcs form a closed screw profile, i.e. the sum of the angles $\alpha_j$ of all of the arcs j is $2\pi$, wherein $\pi$ is pi ($\pi \approx 3.14159$), the arcs form a convex screw profile, all of the arcs of the generating screw profile are located between and/or on the boundary rings of an annulus which has an outer radius ra and an inner radius ri and whose centre point is located at the point of rotation of the generating screw profile, at least one of the arcs of the generating screw profile touches the outer radius ra of the generating screw profile at point $P_A$, at least one of the arcs of the generating screw profile touches the inner radius ri of the generating screw profile at point $P_I$, the number of arcs n' of the generated screw profile is the same as the number of arcs n of the generating screw profile, the outer radius ra' of the generated screw profile equals the difference between the centre distance and the inner radius ri of the generating screw profile (ra'=a−ri), the inner radius ri' of the generated screw profile equals the difference between the centre distance and the outer radius ra of the generating screw profile (ri'=a−ra), the angle $\alpha_{j'}$ of the j'th arc of the generated screw profile is the same as angle $\alpha_j$ of the jth arc of the generating screw profile, wherein j is an index which represents all integers in the range from 1 to the number of arcs n and j' is an index which represents all integers in the range from 1 to the number of arcs n', the sum of the radius $r_{j'}'$ of the j'th arc of the generated screw profile and radius $r_j$ of the jth arc of the generating screw profile equals the centre distance a, wherein j is an index which represents all integers in the range from 1 to the number of arcs n and j' is an index which represents all integers in the range from 1 to the number of arcs n', the distance between the centre point of the j'th arc of the generated screw profile and the centre point of the jth arc of the generating screw profile equals the centre distance a and the distance between the centre point of the j'th arc of the generated screw profile and the point of rotation of the generated screw profile is the same as the distance between the centre point of the jth arc of the generating screw profile and the point of rotation of the generating screw profile, and the connecting line between the centre point of the j'th arc of the generated screw profile and the centre point of the jth arc of the generating screw profile is a line parallel to the connecting line between the point of rotation of the generated screw profile and the point of rotation of the generating screw profile, wherein j is an index which represents all integers in the range from 1 to the number of arcs n and j' is an index which represents all integers in the range from 1 to the number of arcs n', the starting point of the j'th arc of the generated screw profile lies in an opposite direction, in relation to the centre point of the j'th arc of the generated screw profile, to that of the starting point of the jth arc of the generating screw profile in relation to the centre point of the jth arc of the generating screw profile, wherein j is an index which represents all integers in the range from 1 to the number of arcs n and j' is an index which represents all integers in the range from 1 to the number of arcs n'.

The profiles of screw elements according to the invention are characterized in that they can be constructed merely by using an angle ruler and a pair of compasses. Thus the tangential transition between the jth and the (j+1)th arc of the generating screw profile is constructed by forming a circle with a radius around the end point of the jth arc and that point of intersection of this circle with a straight line through the centre point and the end point of the jth arc which is located nearer the point of rotation of the generating screw profile is the centre point of the (j+1)th arc. In practice a computer program is used instead of an angle ruler and a pair of compasses for constructing the screw profiles.

The screw elements according to the invention can be non-symmetrical or symmetrical; screw elements according to the invention are preferably symmetrical. Symmetrical screw elements can be axially symmetrical or dot-symmetrical; preferably screw elements according to the invention are axially symmetrical.

An axially symmetrical screw profile with a flight number Z can be divided into 2·Z symmetrical parts, it being possible for the symmetrical parts to be obtained by mirroring about the axes of symmetry. Due to its symmetry, the profile of an axially symmetrical screw element with Z flights is thus completely defined by a profile section contained in a sector of 360°/(2·Z) between two axes of symmetry of the profile. The remaining profile is obtained by mirroring the profile section about the Z axes of symmetry which intersect each other at the point of rotation and subdivide the angle of 360° around the axis of rotation into 2·Z angles of a size of 360°/(2·Z). In the case of axially symmetrical screw elements, the corresponding screw profiles on adjacent screws (the generating and generated profiles) are also identical or are superimposable by rotation [1].

The same also applies to dot-symmetrical screw profiles, in which the symmetrical parts are obtained by dot-mirroring about the centre of symmetry.

In the following, a special embodiment of screw elements according to the invention is described which is characterized in that the screw elements are axially symmetrical. The number of flights Z of such axially symmetrical screw elements according to the invention is preferably 2 to 8 and particularly preferably 2 to 4.

The profile contour of the cross-section of axially symmetrical screw elements according to the invention can be subdivided into 2·Z profile sections which can be obtained by axial mirroring about the axes of symmetry of the profile.

The number of the arcs n which form one of the profile sections is preferably 2 to 8, and particularly preferably 2 to 4.

The profile of axially symmetrical screw elements according to the invention with Z flights is characterized in that there is only single point $P_A$ within a profile section in a sector of 360°/(2·Z) which is at a distance from the point of rotation which corresponds to the outer radius ra of the screw element. In other words, there is only one point $P_A$ within the profile section which is located on a circle around the point of rotation with an outer radius of ra (the outer circle/ring).

Whereas all points in the region of the tip angle KW wipe the barrel with a narrow intermediate gap in prior art screw profiles (see for example FIG. 1), only point $P_A$ on the outer radius (see for example FIG. 2a) does so in the profile of axially symmetrical screw elements according to the invention.

For practical reasons, the following description is based on a Cartesian coordinate system in which the origin is the point of rotation D of a screw element. The x-axis of the Cartesian coordinate system passes through point $P_A$; the y-axis is positioned vertically to the x-axis at the point of rotation D. FIG. 2a shows such a coordinate system.

It is also recommendable to use dimensionless parameters in order to simplify the process of applying the method to different extruder sizes. The centre distance a is a useful reference value for geometrical dimensions such as, for example, lengths or radii, since this value cannot be changed in an extruder. The following rules apply to the figures in the present specification: The origin of the coordinates x and y is located at the point of rotation of one of the screws. All of the angles are stated in terms of radian measurement. All of the other dimensions are normalized in relation to the centre distance and are written in capital letters: A=a/a; $R_3=r_3/a$; RA=ra/a; RI=ri/a etc.

The profile section of an axially symmetrical screw element according to the invention is characterized in that it consists of tangentially merging arcs between point $P_A$, which is located on the outer radius of the profile, and a point $P_I$, which is located on the inner radius of the profile, wherein straight lines $DP_A$ and $DP_I$, which pass through points $P_A$ and $P_I$ and intersect each other at the point of rotation D, enclose an angle of 360°/(2·Z).

In a special embodiment, the profile section of a screw element according to the invention consists of precisely two arcs between points $P_A$ and $P_I$. These arcs merge into each other at point $P_{FP}$ and, according to the invention, form a continuously differentiable contour over the entire profile section. At point $P_{FP}$ the arcs touch straight line FP. Straight line FP is located at a distance from the point of rotation which corresponds to half the centre distance A and has a gradient (in terms of radian measurement) of $-1/\tan(\pi/(2\cdot Z))$. Point $P_{FP}$ is at a distance from the point of intersection between a tangent at point $P_A$ on the outer radius and the straight line FP which is equal to the distance between this point of intersection and $P_A$. A perpendicular from point $P_{FP}$ to straight line FP intersects straight line $DP_A$, which passes through point $P_A$ and the point of rotation at the centre point $M_1$ of the first profile-generating arc 1, whereas it intersects the straight line $DP_I$, which passes through point $P_I$ and the point of rotation, at the centre point $M_{1'}$ of the other profile-generating arc 1' (see FIG. 2a). The radius $R_1^{2K}$ of the profile-generating arc 1 thus corresponds to the distance between $M_1$ and $P_A$; the radius $R_1^{2K}$ of arc 1' corresponds to the distance between $M_{1'}$ and $P_I$.

In an additional special embodiment, the profile section of a screw element according to the invention is composed of precisely three arcs between points $P_A$ and $P_I$. This provides an additional degree of freedom and, by selecting a small radius, the profile in the region of point $P_A$, which wipes the cylinder wall, can be made narrower, thus further reducing the dissipation of energy.

FIG. 2b shows an example of a profile section of a two-flight screw element according to the invention which consists of three arcs. The radius $R_1$ of arc 1, which begins at point $P_A$, is freely selectable within the range $0 < R_1 < R_1^{2K}$. Its centre point $M_1$ is located on the connecting line between D and $P_A$.

The radius of arc 3, which begins at point $P_I$, is $R_3 = A - R_1$. Its centre point $M_3$ is located on the line passing through D and $P_I$.

Between these two arcs, arc 2 with a radius $R_2 = A/2$ is formed in a continuously differentiable manner. Its centre point $M_2$ is located at a distance $A/2 - R_1$ from point $P_1$ and at a distance $R_3 - A/2$ from point $P_3$.

One end of arc 1 is located at point $P_A$ and the other end at the point of intersection with the straight line through $P_1$ and $P_2$.

One end of arc 3 is located at point $P_I$ and the other at the point of intersection with the straight line through $M_2$ and $M_3$.

By being able to freely select one of the radii $R_1$ or $R_3$ it is possible to construct different fully wiping screw profiles according to the invention for a given centre distance A. It is thus also possible to construct asymmetical screw profiles according to the invention by using the same screw profile in corresponding screw profile sections measuring 360°/(2·Z) in both screws, while sections measuring 360°/(2·Z) are constructed differently in one screw. Such constructions are useful when, for dispersion purposes, special deformations are to be imposed on the material to be conveyed, such as for example slow compression followed by rapid expansion.

Screw elements which are composed of more than three arcs within a profile section measuring 360°/(2·Z) also form part of the subject matter of the present invention. According to the invention the arcs merge tangentially into each other at their starting and end points.

The ratio RA=ra/a between the outer radius ra of the screw element and the centre distance a is preferably between 0.54 and 0.7, and particularly preferably between 0.58 and 0.63, for two-flight screws according to the invention, preferably between 0.53 and 0.57, and particularly preferably between 0.54 and 0.56, for three-flight screws and preferably between 0.515 and 0.535 for four-flight screws.

The screw elements according to the invention can be designed as conveying elements, kneading elements or mixing elements.

As is known (see, for example pages 227-248 of Kohlgrüber), a conveying element is characterized by a screw profile which continuously rotates and extends in the form of a screw in an axial direction. The conveying element can be right- or left-handed. The pitch t of the conveying element, i.e. the axial length required for the complete rotation of the screw profile, can have values from 0.1 to 10 times the outer diameter. Preferably the pitch t is in the range from 0.3 to 3 times the outer diameter. The axial length of a conveying element is, for practical reasons, preferably in the form of integral multiples of t/Z.

As is known (see, for example pages 227-248 of Kohlgrüber), a kneading element is characterized by a screw profile which extends in an axial direction in steps in the form of kneading discs. The kneading discs can be arranged in a right-handed, left-handed or neutral fashion. The axial length of the kneading discs is preferably in the range from 0.02 to 2 times the outer diameter. The axial distance between two adjacent kneading discs is preferably in the range from 0.001 to 0.1 times the outer radius.

As is known (see, for example, pages 227-248 of Kohlgrüber), mixing elements are formed by designing conveying elements with openings in the screw tips. The mixing elements can be right- or left-handed. Their pitch t is preferably in the range from 0.1 to 10 times the outer diameter. The axial length of a mixing element is, as in the case of the conveying elements, preferably in the form of integral multiples of t/Z. The openings are preferably designed in the form of a u- or v-shaped groove. If the mixing element is in the form of a conveying element, the grooves are arranged preferably in a backward-conveying manner or parallel to the axis.

The present invention also relates to a method of generating the screw elements according to the invention. Screw elements according to the invention are characterized by profiles which have continuously differentiable (smooth) contours. The method according to the invention for generating screw elements for multi-screw extruders having pairs of co-rotating and fully wiping screws with a centre distance a and two or more flights is characterized in that the entire cross-sections of the screw profiles consist of n/n' arcs, wherein n/n' is an integer which is greater than or equal to 2.

The method according to the invention is characterized in that
- the generating screw profile has an outer radius ra which is greater than 0 (ra>0) and smaller than the centre distance (ra<a),
- the generating screw profile has an inner radius ri which is greater than 0 (ri>0) and smaller than or equal to ra (ri≤ra),
- the arcs are arranged in succession by determining their position and size in such a manner that all of the arcs of the generating screw profile merge tangentially into each other, the arcs form a closed, convex screw profile, all of the arcs of the generating screw profile are located between and/or on the boundary rings (circles) of an annulus which has an outer radius ra and an inner radius ri, whose centre points are positioned at the point of rotation of the generating screw profile, at least one of the arcs of the generating screw profile touches the outer radius ra of the generating screw profile at point $P_A$ and at least one of the arcs of the generating screw profile touches the inner radius ri of the generating screw profile at point $P_I$,
- the n' arcs of the generated screw profile are based on the n arcs of the generating screw profile such that
  - the number of arcs n' of the generated screw profile is identical to the number of arcs n of the generating screw profile,
  - the outer radius ra' of the generated screw profile equals the difference between the centre distance a and the inner radius ri of the generating screw profile (ra'=a−ri),
  - the inner radius ri' of the generated screw profile equals the difference between the centre distance a and the outer radius ra of the generating screw profile (ri'=a−ra),
  - angle $\alpha_{j'}$ of the j'th arc of the generated screw profile is the same as angle $\alpha_j$ of the jth arc of the generating screw profile, wherein j is an index which represents all integers in the range from 1 to the number of arcs n and j' is an index which represents all integers in the range from 1 to the number of arcs n',
  - the sum of radius $r_{j'}$ of the j'th arc of the generated screw profile and radius $r_j$ of the jth arc of the generating screw profile equals the centre distance a, wherein j is an index which represents all integers in the range from 1 to the number of arcs n and j' is an index which represents all integers in the range from 1 to the number of arcs n',
  - the distance between the centre point of the j'th arc of the generated screw profile and the centre point of the jth arc of the generating screw profile equals the centre distance a and the distance between the centre point of the j'th arc of the generated screw profile and the point of rotation of the generated screw profile is the same as the distance between the centre point of the jth arc of the generating screw profile and the point of rotation of the generating screw profile, and the connecting line between the centre point of the j'th arc of the generated screw profile and the centre point of the jth arc of the generating screw profile is a line parallel to the connecting line between the point of rotation of the generated screw profile and the point of rotation of the generating screw profile, wherein j is an index which represents all integers in the range from 1 to the number of arcs n and j' is an index which represents all integers in the range from 1 to the number of arcs n',
  - the starting point of the j'th arc of the generated screw profile lies in an opposite direction in relation to the centre point of the j'th arc of the generated screw profile, to that of the starting point of the jth arc of the generating screw profile in relation to the centre point of the jth arc of the generating screw profile, wherein j is an index which represents all integers in the range from 1 to the number of arcs n and j' is an index which represents all integers in the range from 1 to the number of arcs n'.

The method according to the invention is characterized in that it can be carried out merely by using an angle ruler and a pair of compasses. Thus the tangential transition between the jth and the (j+1)th arc of the generating screw profile is constructed by forming a circle with a radius $r_{j+1}$ around the end point of the jth arc, and that point of intersection between this circle and a straight line through the centre point and the end point of the jth arc which is located nearer the point of rotation of the generating screw profile is the centre point of the (j+1)th arc.

It is recommendable to carry out the method of generating screw profiles by means of a computer. The dimensions of the screw elements are then in a form in which they can be fed to a CAD milling machine for producing the screw elements. The present invention therefore also relates to a computer program product with program code means for executing the method according to the invention for generating screw profiles according to the invention in a computer. In a preferred embodiment, the user of the computer program product preferably has a graphical user interface at his/her disposal, with the aid of which he/she can enter the parameters (the number of arcs of the generating and generated screw profile, the radii and the angles) to be selected. Preferably he/she is aided by instructions from the computer system if the selected parameter values would not produce pairs of screw profiles which wipe each other. On entering the parameter values he/she is preferably assisted by instructions concerning the permitted parameter value ranges. Permitted parameter values are understood to be such combinations of parameter values which produce pairs of fully wiping screw profiles.

In a preferred embodiment, not only the profiles but also entire screw elements are constructed virtually in a computer. The construction results are preferably fed to a computer screen or a printer in the form of construction drawings. It is also possible for the results to be supplied in the form of an electronic data file which, in a preferred embodiment, can be fed to a CAD milling machine for producing the corresponding screw elements.

After the profile has been generated in the above manner the screw elements according to the invention can be produced using, for example, a milling machine. Preferred materials for producing the screw elements are steels, and in particular nitrated steels, chromium, tool and stainless steels, as well as iron-, nickel- or cobalt-based metal composite materials produced by powder metallurgy.

The method according to the invention makes it possible to design the profile of a screw right from the outset in such a manner that it is optimally suitable for a specified task. The screw elements known from the prior art are in most cases not optimally designed for a concrete task. On the contrary, manufacturers supply screw elements (conveying, kneading and mixing elements) from a set modular system independently of a concrete task. The present invention makes it possible to almost completely freely design the profiles of self-cleaning screw elements. It is thus possible to optimize the parameters of such profiles for the application concerned down to the most minute variation. In this connection it is important to note that there is no restriction on the number of arcs used for producing screw profiles. It is thus possible to approximate, with the required precision, screw profiles which are not composed of arcs and are therefore not self-cleaning by using a sufficiently high number of arcs. The profile approximated by means of arcs is of course self-cleaning.

It is also possible to calculate the longitudinal profile of a (generating or generated) screw profile. Preferably each arc of a screw profile is used for calculating that part of the longitudinal cross-section which belongs to this arc by means of an explicit function. In a first step the point of intersection (Sx, Sy) between a straight line g and an arc kb is determined. The straight line g is located in the plane of the screw profile and it leads through the point of rotation of the screw profile. The orientation of the straight line is given by angle $\phi$.

Arc kb is characterized by its radius r and the position of its centre point (Mx, My). In a second step the distance s of the point of intersection (Sx, Sy) from the point of rotation of the screw profile is calculated. The point of intersection of a straight line with an arc can be calculated by an explicit function. The same applies to the calculation of the distance. The distance is therefore $s=s(\phi, r, Mx, My)$. Given a known pitch t of a screw element angle $\phi$ can be converted into an axial position z_ax by means of $\phi/2\pi*t$, so that the distance is $s=s(z\_ax, r, Mx, My)=s(\phi/2\pi*t, r, Mx, My)$. The function $s(z\_ax, r, Mx, My)$ defines the longitudinal profile of an arc of the screw profile.

The present invention also relates to the use of the screw elements according to the invention in multi-screw extruders. Preferably the screw elements according to the invention are used in twin-screw extruders. The screw elements can be contained in multi-screw extruders in the form of kneading, mixing or conveying elements. It is also possible to combine kneading, conveying and mixing elements with each other in one extruder. The screw elements according to the invention can also be combined with other screw elements which are, for example, known from the prior art.

In multi-screw extruders with pairs of co-rotating and fully wiping screws the screw elements according to the invention form a channel over their entire periphery. This channel has an alternately increasing and decreasing channel width and in the present context is referred to as a convergent/divergent channel. In such a convergent/divergent channel a combination of shear and elongational flow which has very efficient dispersing action is produced during operation over the entire length of the channel. The energy input is lower than in conventional prior art screw elements with bends in their profile.

Eccentrically arranged circular discs also form a convergent/divergent channel. The screw elements according to the invention do however have a smaller peripheral region with a very narrow intermediate gap than eccentrically arranged circular discs. The energy input is therefore lower when using screw elements according to the invention in multi-screw extruders than when using eccentrically arranged circular discs.

BRIEF DESCRIPTION OF THE DRAWINGS

The invention is illustrated in more detail hereinbelow by means of the figures, without however being limited thereto.

In FIG. 4a, gap S between the reciprocally wiping screws is equally as large as gap D in the region where the screws wipe the barrel. In FIG. 4b gap S is smaller than D and in FIGS. 4c and 4d the opposite is the case, i.e. D is smaller than S.

FIG. 13b shows the coordinate values.

DETAILED DESCRIPTION OF THE INVENTION

It is recommendable to use dimensionless parameters in order to simplify the process of applying the method to different extruder sizes. The centre distance a is a useful reference value for geometrical dimensions such as, for example, lengths or radii, since this value cannot be changed in an extruder.

The following rules apply to the figures hereinbelow: The origin of the coordinates x and y is located at the point of rotation of one of the screws. All of the angles are stated in terms of radian measurement. All of the other dimensions are normalized in relation to the centre distance and are written in capital letters: A=a/a; $R_3=r_3/a$; RA=ra/a; RI=ri/a T=t/a etc. Mx and My are the x and y coordinates of the centre of the circle of a profile-generating arc, R is the radius normalized in relation to the centre distance a and a is the angle of an arc. In addition, RG=the normalized barrel radius, RV=the normalized virtual barrel radius, RA=the normalized outer radius of the fully wiping profile, RF=the normalized outer radius of the screw to be produced, S=the normalized clearance (gap) between the individual screws, D=the normalized clearance between the screw and the barrel, VPR=the normalized degree of shift of the profiles, VPW=the angle of the shift of the profiles in terms of radian measurement, VLR=the normalized degree of shift of the lefthand screw, VLW=the angle of shift of the lefthand screw, VRR=the normalized degree of shift of the righthand screw, VRW=the angle of shift of the righthand screw.

Figure 1:
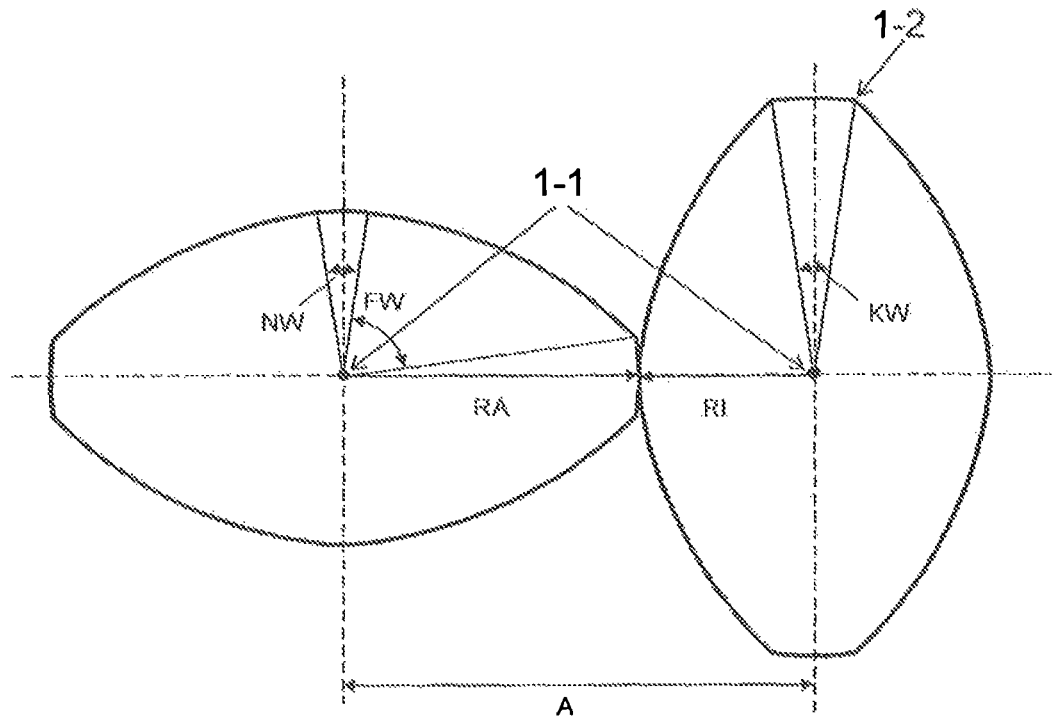
FIG. 1 shows a cross-section of two fully wiping two-flight prior art screw elements arranged at a distance A from each other.

FIG. 1 shows a cross-section of two fully wiping two-flight prior art screw elements arranged at a distance A from each other. The screw elements have the same axially symmetrical profile. The righthand screw element is rotated through an angle of 90° in relation to the lefthand screw element. The points labelled 1-1 are the points of rotation of the shafts on which the screw elements are arranged. The profile depicted is composed of several symmetrical sections. Bends are formed at the transitions between the sections (one of the bends is labelled 1-2). In the region of the tip angle KW the product is subject to a high degree of shear without elongation when multi-screw extruders are operated using such screw elements.

Figure 2A:
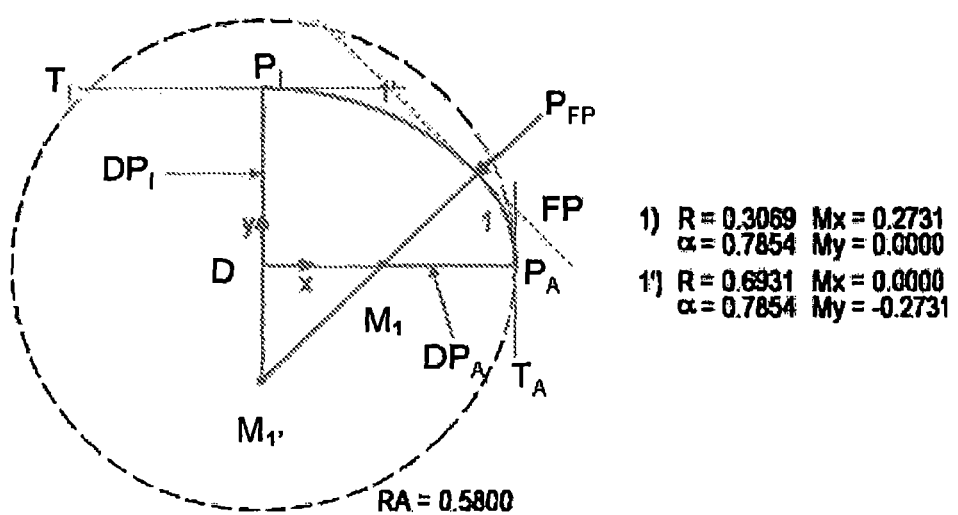
FIG. 2a shows a cross-section of a quarter of the profile of a two-flight fully wiping screw element (a generating screw element).

This disadvantage is avoided by a screw element according to the invention with a profile according to FIG. 2. FIG. 2a shows a cross-section of a quarter of the profile of a two-flight fully wiping screw element (a generating screw element). This profile is axially symmetrical to the x and y axes, so that the entire profile would be formed by mirroring the depicted quarter about the x and y axes. The profile of the corresponding (generated) screw element is then formed by rotating the profile of the generating screw element through an angle of 90°. The origin of the coordinates is the point of rotation D of the screw in this and all the other figures. The outer radius RA is depicted in the form of a broken circle around the profile. The barrel bore is depicted in the form of a concentric circle around the latter with a radius RG, which exceeds the outer radius by clearance S (RG=RA+S). The screw profile according to FIG. 2a consists of two arcs which merge into each other without a bend. The coordinates of the arcs are shown in FIG. 2a. The centre point $M_1$ of arc 1 is located on a horizontal line through the point of rotation, and the centre point $M_{1'}$ of arc 1' is located on a vertical line through the point of rotation ($M_{1y}$=0; $M_{1'x}$=0). The transition from arc 1 to arc 1' takes place at point $P_{FP}$, at which both arcs touch straight line FP.

The depicted profile section can be constructed by:

fixing a point $P_A$ at a distance from the point of rotation D of the screw element which corresponds to the outer radius RA of the screw element, fixing a point $P_I$ at a distance from the point of rotation D of the screw element which corresponds to the inner radius RI of the screw element, point $P_I$ being located on a straight line $DP_I$ through point D which, together with a straight line $DP_A$ through points $P_A$ and D, encloses an angle of 360°/(2·Z), fixing straight line FP at a distance from the point of rotation D which corresponds to half the centre distance A of the screw element, the slope of FP, in terms of radian measurement, being $-1/\tan(\pi/(2·Z))$, fixing the point of intersection between the tangent $T_A$ at point $P_A$ on the outer circle having radius RA around point of rotation D and the straight line FP and fixing point $P_{FP}$ on straight line FP at the same distance from the aforesaid point of intersection as $P_A$ and at a distance from the point of rotation which is smaller than that of radius RA, fixing centre point $M_1$ at the point of intersection between the vertical line to FP beginning at point $P_{FP}$ and the straight line $DP_A$, fixing the centre point $M_{1'}$ at the point of intersection between the vertical line to FP beginning at point $P_{FP}$ and the straight line passing through D and $P_1$, generating an arc 1 about centre point $M_1$ between points $P_A$ and $P_{FP}$, generating an arc 1' about centre point $M_{1'}$ between points $P_I$ and $P_{FP}$.

Figure 2B:
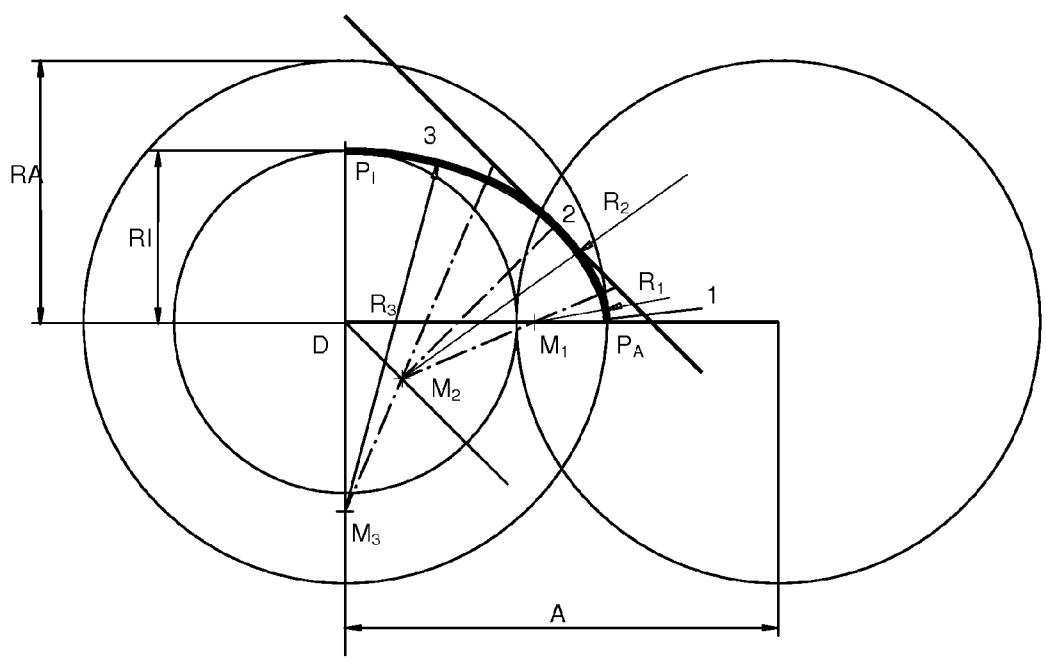
FIG. 2b shows an example of a profile section of a two-flight screw element according to the invention which consists of three circles.

FIG. 2b shows an example of a profile section of a two-flight screw element according to the invention which consists of three circles. Point D is the point of rotation of the screw element (the generating screw element). The point of rotation of the corresponding screw element (the generated screw element) is at a distance A from the point of rotation D. A circle with an inner radius RI (the inner boundary ring) and a circle with an outer radius RA (the outer boundary ring) are depicted around the point of rotation D. The inner circle and the outer circle form an annulus. All of the points of the profile section and the resulting overall profile of the screw element according to the invention are located between or on the inner and outer circles (boundary rings) of this annulus. Point $P_A$ is the starting point of a first arc 1 with radius $R_1$ and centre point $M_1$, which is located on the straight line between D and $P_A$. Point $P_A$ is located on the outer circle. Point $P_1$ is the starting point of arc 3 with a radius $R_3=A-R_1$. Its centre point $M_3$ is positioned on the vertical line passing through $P_I$ and D. Arc 2 with a radius $R_2=A/2$ extends with continuous differentiability (i.e. smoothly) between arc 1 and arc 3. Its centre point $M_2$ is located at a distance $(A/2)-R_1$ from point $P_1$ and at a distance $R_3-(A/2)$ from point $M_3$. By continuously mirroring the depicted profile section about a straight line passing through points D and $P_A$ and about a straight line passing through points D and $P_I$, the overall profile of the (generating) screw element according to the invention can be constructed. The profile of the corresponding (generated) screw element is in this case obtained simply by rotating the profile of the generating screw profile through an angle of 90° around the point of rotation D.

Figure 2C:
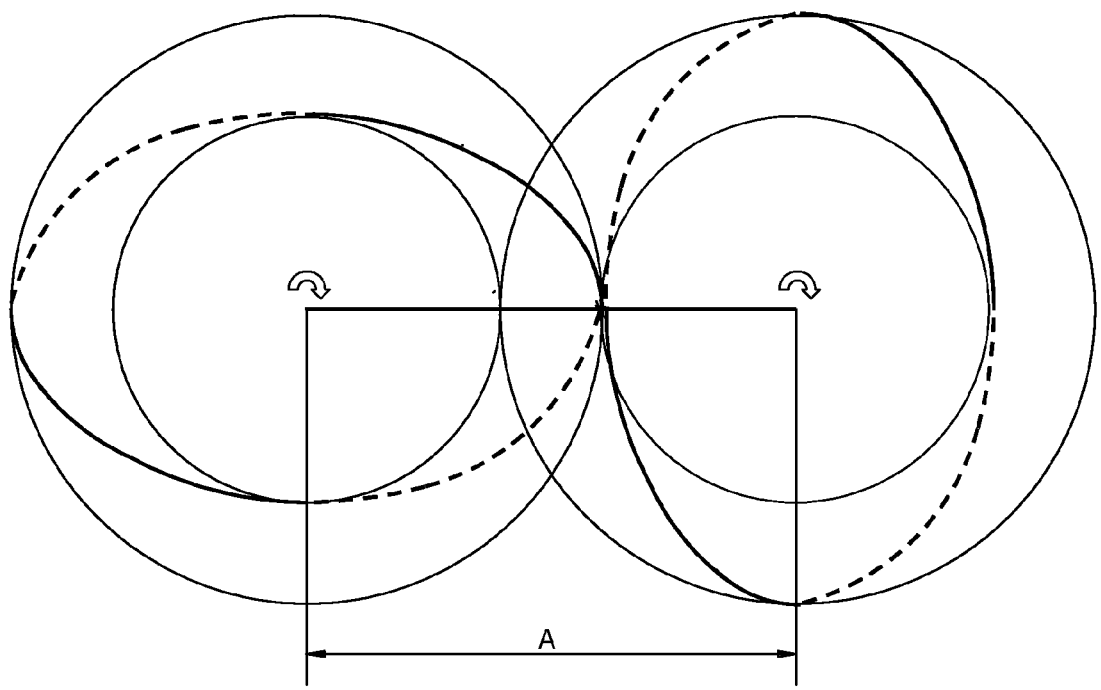
FIG. 2c shows an example of screw elements according to the invention in which the profile sections depicted by broken lines are not superimposable by axial mirroring on the profile sections depicted by continuous lines.

FIG. 2c shows an example of screw elements according to the invention in which the profile sections depicted by broken lines are not superimposable by axial mirroring on the profile sections depicted by continuous lines. Instead, the profiles are dot-symmetrical in relation to the point of rotation.

Figure 3:
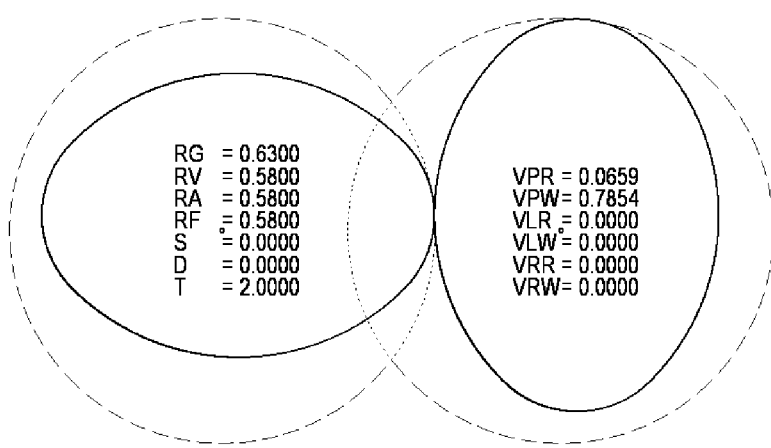
FIG. 3 shows a special embodiment of screw elements according to the invention is shown as an example in FIG. 3.
Figure 4A:
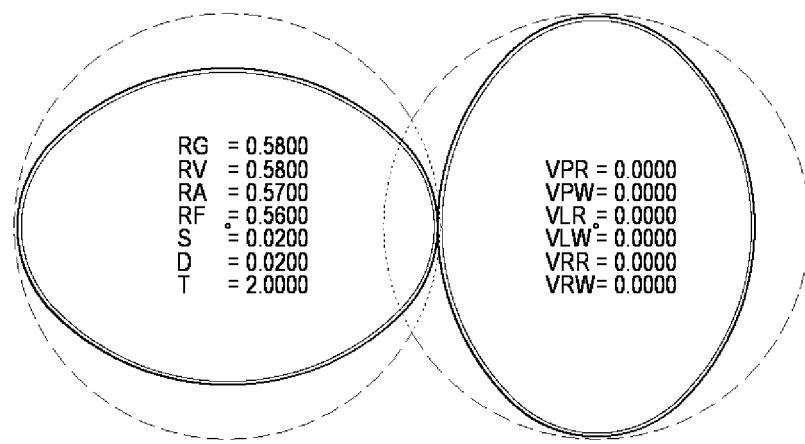
FIG. 4a-d shows examples of profiles of screw elements according to the invention which have gaps (clearances).
Figure 4B:
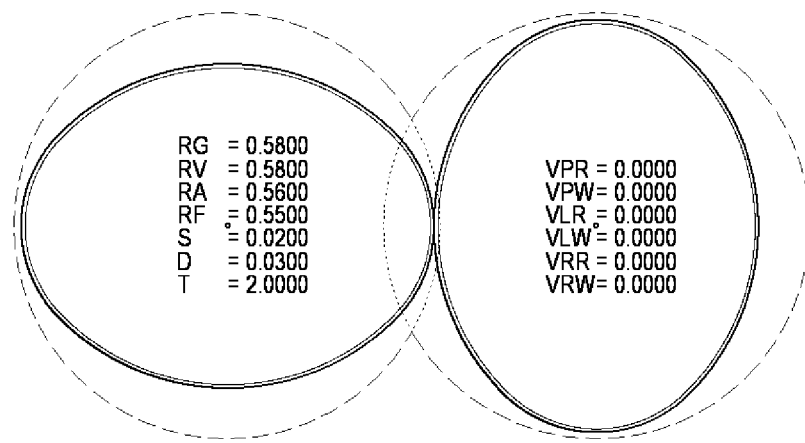
Figure 4C:
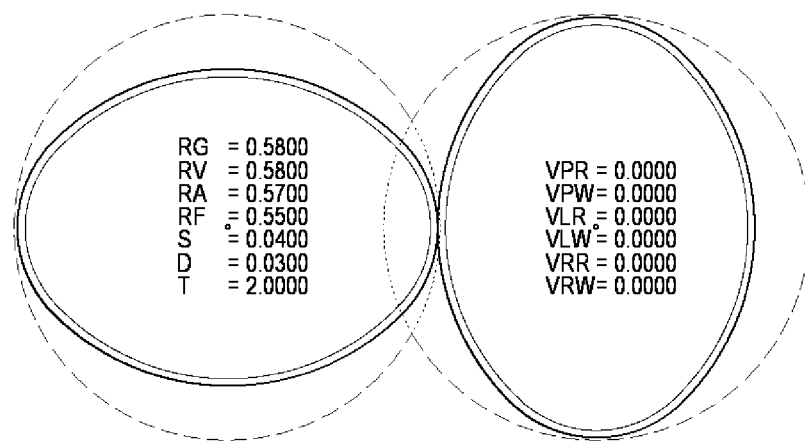
Figure 4D:
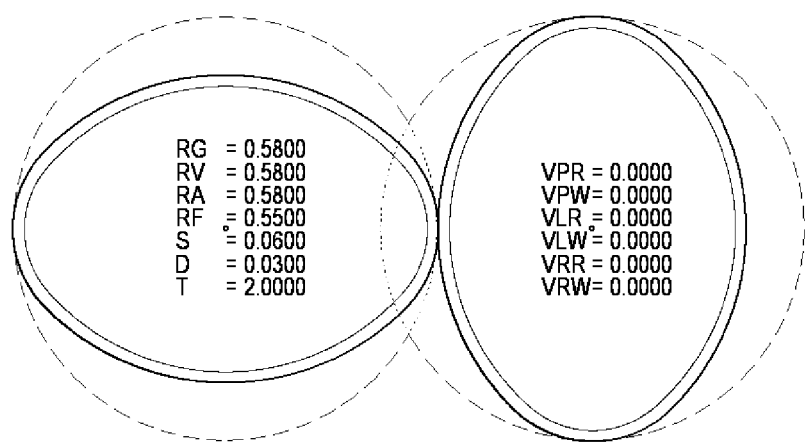
Figure 5A:
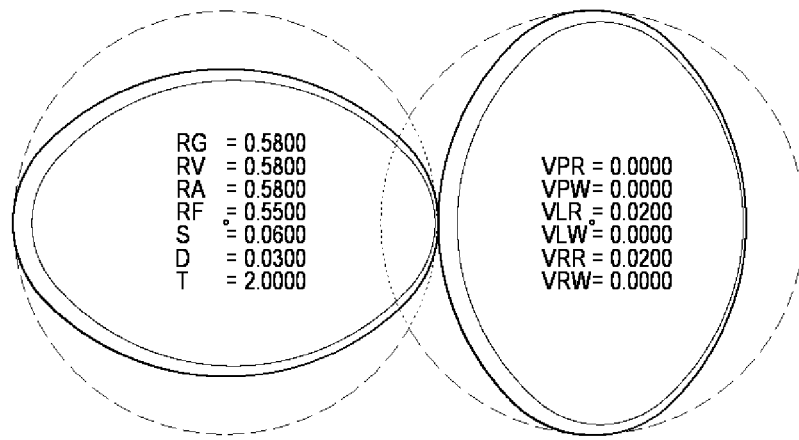
FIG. 5a-d shows that eccentric profiles are also obtained when a screw profile is constructed with gaps and the profiles are then shifted within the gaps.
Figure 5B:
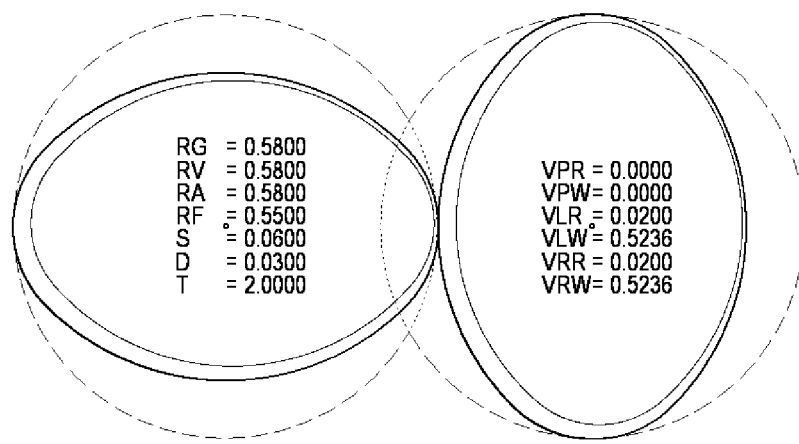
Figure 5C:
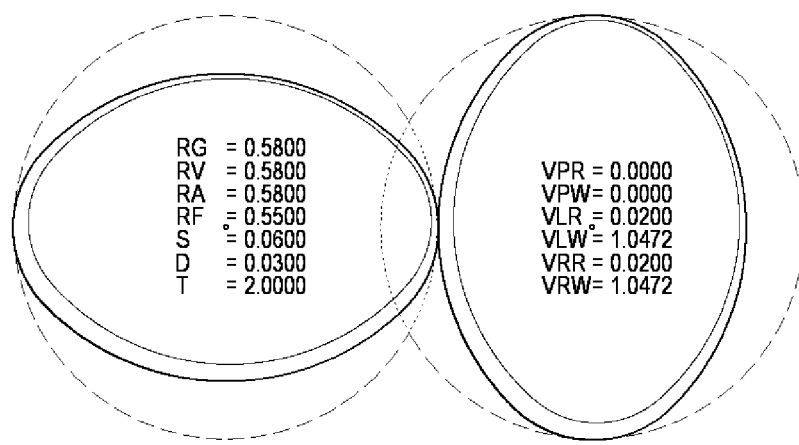
Figure 5D:
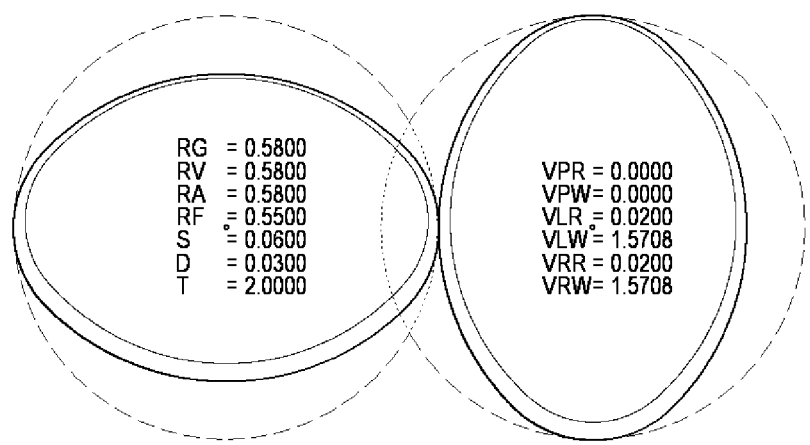

A special embodiment of screw elements according to the invention is shown as an example in FIG. 3. It is characterized in that the barrel bores have a larger radius than the outer radius of the screw profiles and the pairs of screw profiles are shifted in relation to the centre points of the barrel bores, while the points of rotation (depicted by small circles) remain in the centres of the barrel bores. This surprisingly produces an additional considerable reduction in energy input. The resulting eccentrically rotating screw elements, i.e. which do not revolve around the centres of their own profiles but around the centre points of the barrel bores, can be shifted freely within the barrel bores. FIG. 3 shows a particularly poignant case where the two profiles are shifted in parallel to the same degree along a straight line passing through the two points of rotation as that to which they are shifted vertically in relation to this line until they touch the barrel contour. As a result, the screws fully wipe each other, although only one of the two tips of each screw in each case fully wipes the barrel. This arrangement provides complete wiping of all of the surfaces while at the same time reducing the energy input.

So far in the present specification only fully wiping screw profiles have been described. In industrially designed extruders it is however necessary to use geometries which are not fully wiping in order to obtain precisely defined gaps during the wiping process. This is necessary to prevent metallic "erosion", to cater for manufacturing tolerances and to avoid excessive dissipation of energy in the gaps. Various strategies are possible for producing uniform gaps. The most commonly used strategy is that of producing gaps which are of equal width throughout the longitudinal cross-section of the extruder. The method of producing such screw profiles is described on pages 103 et seq. of Kohlgrüber.

The rules for generating screw profiles with specifically defined gaps can be applied to the screw elements according to the present invention.

FIG. 4 shows examples of profiles of screw elements according to the invention which have gaps (clearances). In FIG. 4a, gap S between the reciprocally wiping screws is equally as large as gap D in the region where the screws wipe the barrel. In FIG. 4b gap S is smaller than D and in FIGS. 4c and 4d the opposite is the case, i.e. D is smaller than S.

FIG. 5 shows that eccentric profiles are also obtained according to the invention when a screw profile is constructed with gaps and the profiles are then shifted within the gaps. The profiles of FIGS. 5a-d are identical to the profile of FIG. 4d. In relation to a straight line through the points of rotation of the screw element the shift takes place at an angle of 0° in FIG. 5a, at an angle of 30° in FIG. 5b, at an angle of 60° in FIG. 5c and at an angle of 90° in FIG. 5d.

FIG. 5 shows examples in which both screws are shifted by the same shift vector. Fundamentally it is also possible to shift both screws by a different vector within the clearances. Profiles are then obtained which wipe each other with an intermediate gap which varies over one revolution of the screws.

Figure 6A:
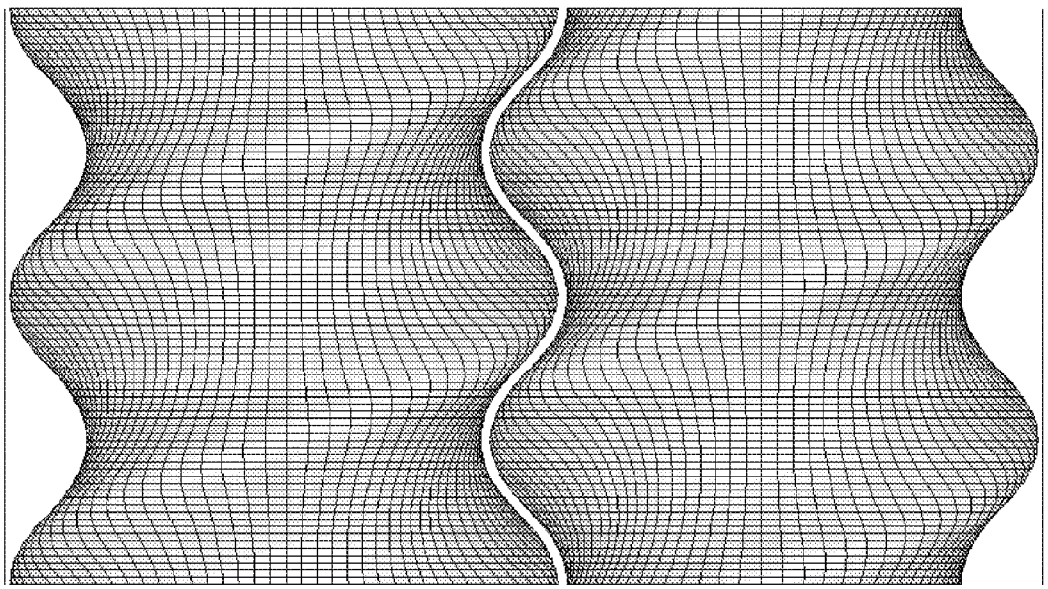
FIG. 6a shows a thread obtained.

As is known, the conveying effect of a pair of profiles is obtained by continuously rotating the profiles in an axial direction. A conveying thread is thereby obtained as shown, for example, in FIG. 6a.

Figure 6B:
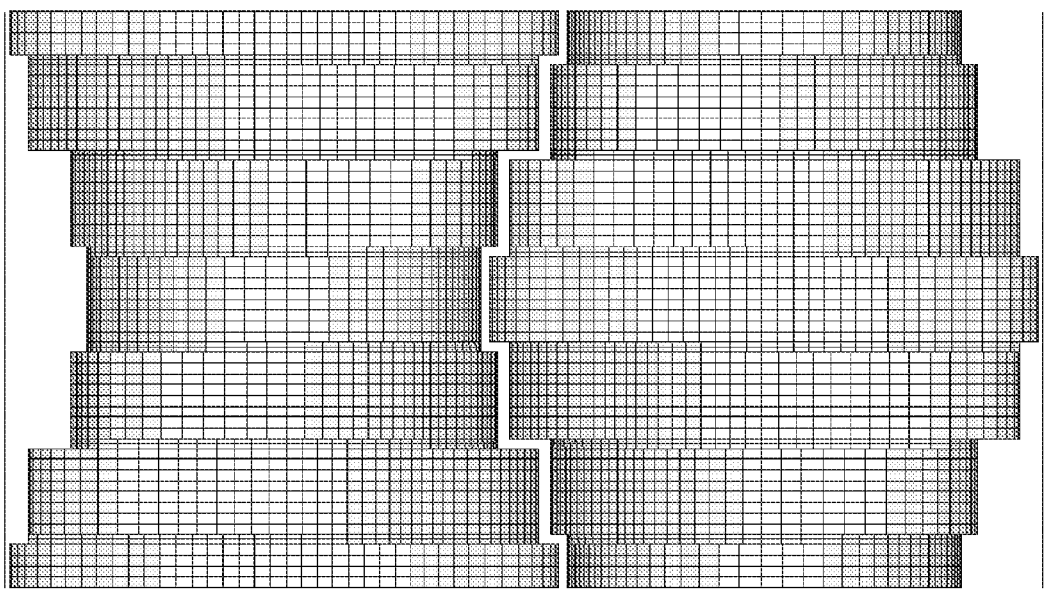
FIG. 6b shows one example of a kneading element with seven kneading discs staggered around the axis at angles of in each case 30°.

Kneading elements with increased dispersing power compared with the conveying thread are obtained by arranging prismatic discs consisting of self-cleaning profiles in a rotationally staggered relationship to each other around the axis. FIG. 6b shows one example of a kneading element with seven kneading discs staggered around the axis at angles of in each case 30°.

Figure 7:
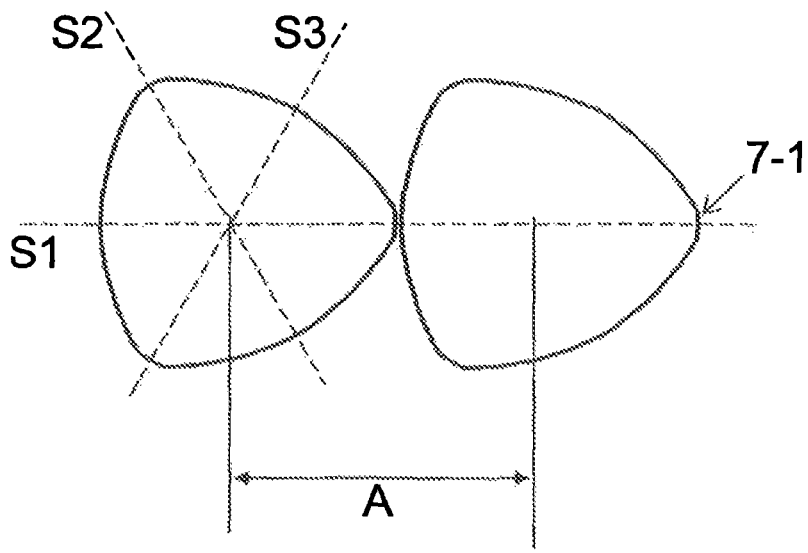
FIG. 7 is a cross-sectional view of two three-flight screw elements according to the prior art.

FIGS. 1 to 6 relate solely to two-flight screw elements. The same principles can however also be applied to screw elements with three and more flights. FIG. 7 is a cross-sectional view of two three-flight screw elements according to the prior art (see, for example, page 103 of Kohlgrüber). The three-flight profile in FIG. 7 consists of three symmetrical sections. Bends and the screw tips between the bends form transitional regions between these sections. In FIG. 7 one of these transitional regions is labelled 7-1. In this region the profile rotates at a narrow distance from the barrel and imposes—with the abovementioned disadvantages—pure shear forces on the polymer melt.

Figure 8:
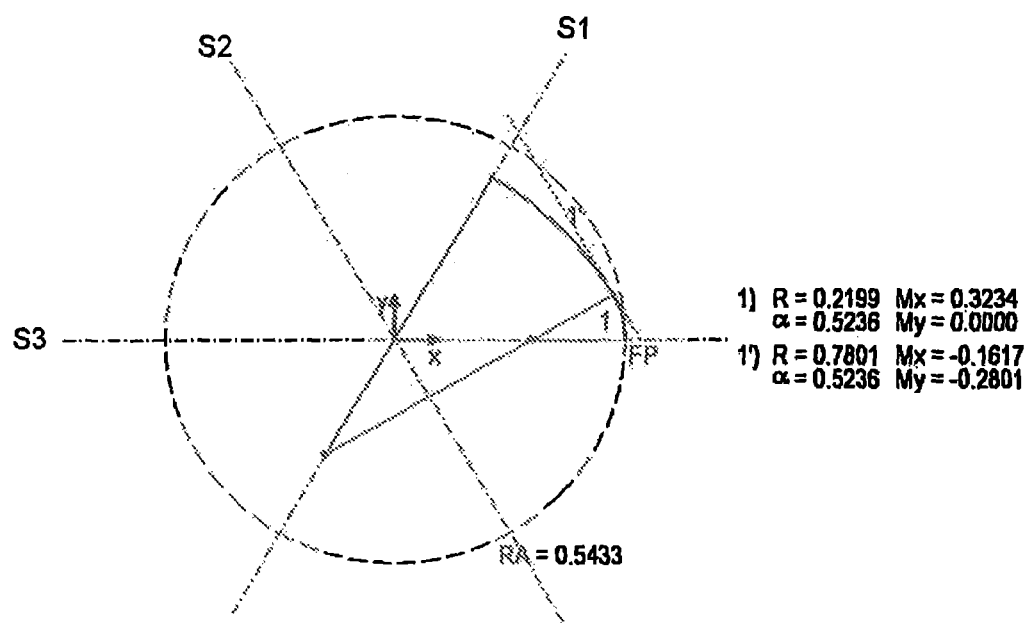
FIG. 8 shows a profile section of a three-flight screw element according to the invention.

In contrast, FIG. 8 shows a profile section of a three-flight screw element according to the invention. Since this profile is axially symmetrical about three straight lines (S1, S2, S3) which are arranged at angles of 60° to each other and pass through the origin of the coordinates, only one 60° section is shown in this figure. The entire profile is formed by continuously mirroring the depicted profile contour about the mirroring straight lines S1, S2 and S3. The profile contour consists of two arcs. The resulting screw has a convergent/divergent channel which imposes on the material to be mixed a combination of shear and elongational flow over its entire periphery. The tangential transition between the profile-producing arcs 1 and 1' takes place at the point at which the profile touches the straight line FP. For three-flight profiles the straight line FP, which is at a distance from the point of rotation of half the centre distance, has a slope of −1.73. The configuration shown in FIG. 8 can be applied analogously to all ratios between the outer screw radius and the centre distance in the range from 0.5 to 0.577.

Figure 9A:
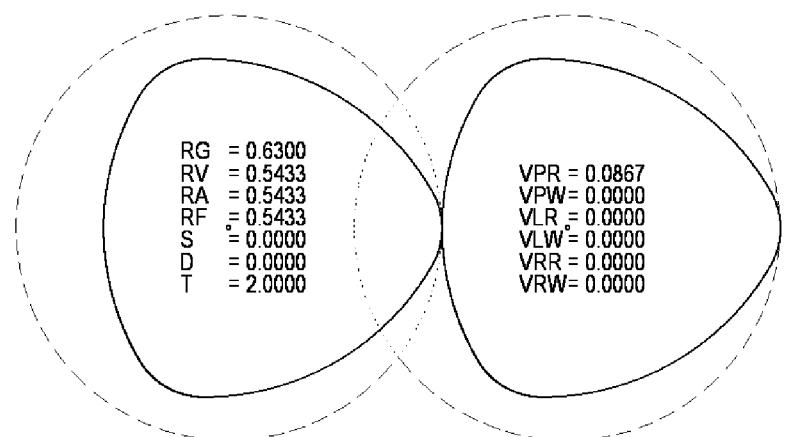
FIG. 9a shows a generation of profile in which the profile is shifted horizontally towards the right until the righthand screw tip reaches the contour of the barrel.
Figure 9B:
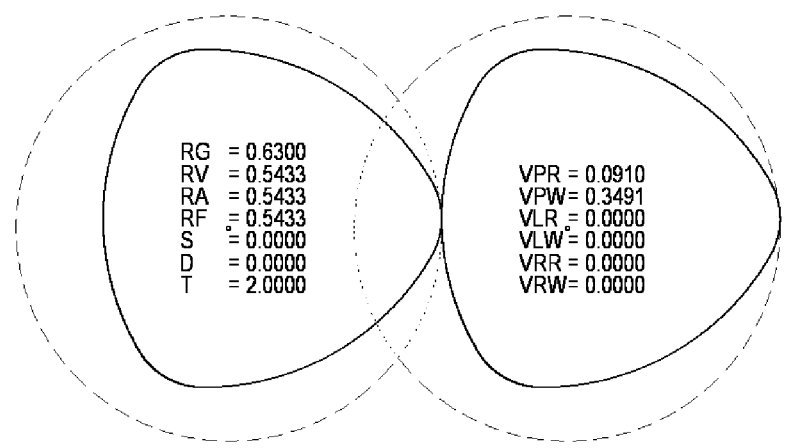
FIG. 9b-c shows additional arrangements in which one of the three screw tips wipes the barrel are obtained on shifting the profiles at an angle of 20° or 40° in relation to a straight line passing through the points of rotation.
Figure 9C:
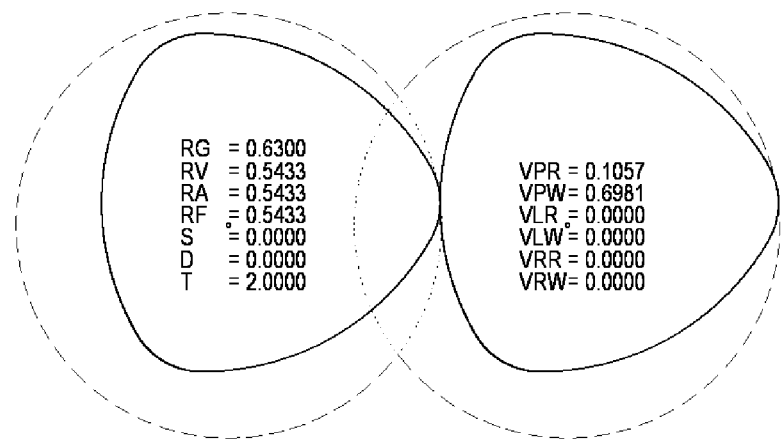
Figure 9D:
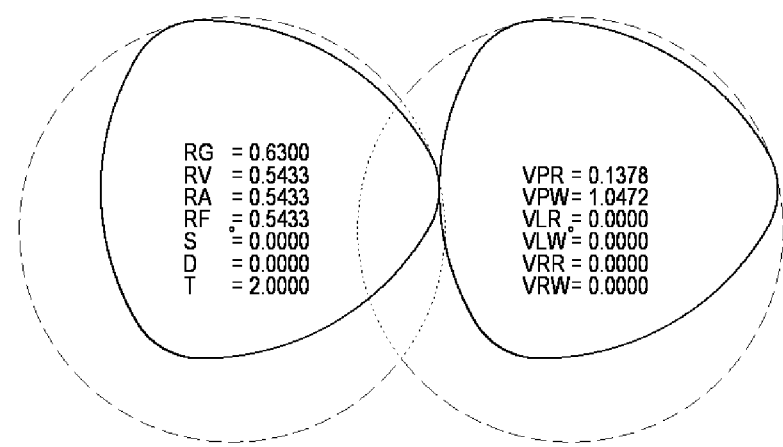
FIG. 9d shows the profile at an angle of 60° in relation to a straight line passing through the points of rotation.

Eccentrically rotating profiles can be constructed for the three-flight profiles. Such screw profiles are shown in FIGS. 9a-d. This method of construction is similar to that used for the two-flight profiles. The outer radius of the profile is smaller than that of the barrel radius and the profile of pairs of screws is shifted, the point of rotation at the centre of the barrel being maintained. Of particular interest are screw profiles in which the screws completely wipe each other and in which the barrel is only wiped by one of three tips. FIG. 9a depicts the generation of such a profile in which the profile is shifted horizontally towards the right until the righthand screw tip reaches the contour of the barrel. In this arrangement symmetrical screw channels are formed between the profile and the barrel. Additional arrangements in which one of the three screw tips wipes the barrel are obtained on shifting the profiles at an angle of 20° (FIG. 9b) or 40° in relation to a straight line passing through the points of rotation (FIG. 9c). In these profiles the resulting screw channel is asymmetrical. As the shift increases, one region with more intense shear (at the top of FIGS. 9b and 9c) and one region with less intense shear (at the bottom of FIGS. 9b and 9c) is formed. On shifting the profile at an angle of 60° in relation to a straight line passing through the points of rotation (FIG. 9d), an arrangement can be obtained in which two of the three tips wipe the barrel. In this arrangement the asymmetry is at its greatest. Two regions with very intense shear stress (at the top of FIG. 9d) and one region with low shear stress (at the bottom of FIG. 9d) are obtained. The material to be processed is therefore exposed to highly fluctuating degrees of stress, this being helpful for dispersing processes.

The generation of gaps in the reciprocal wiping of the profiles and in the wiping of the barrel is completely analogous to the method used for two-flight profiles.

Figure 10A:
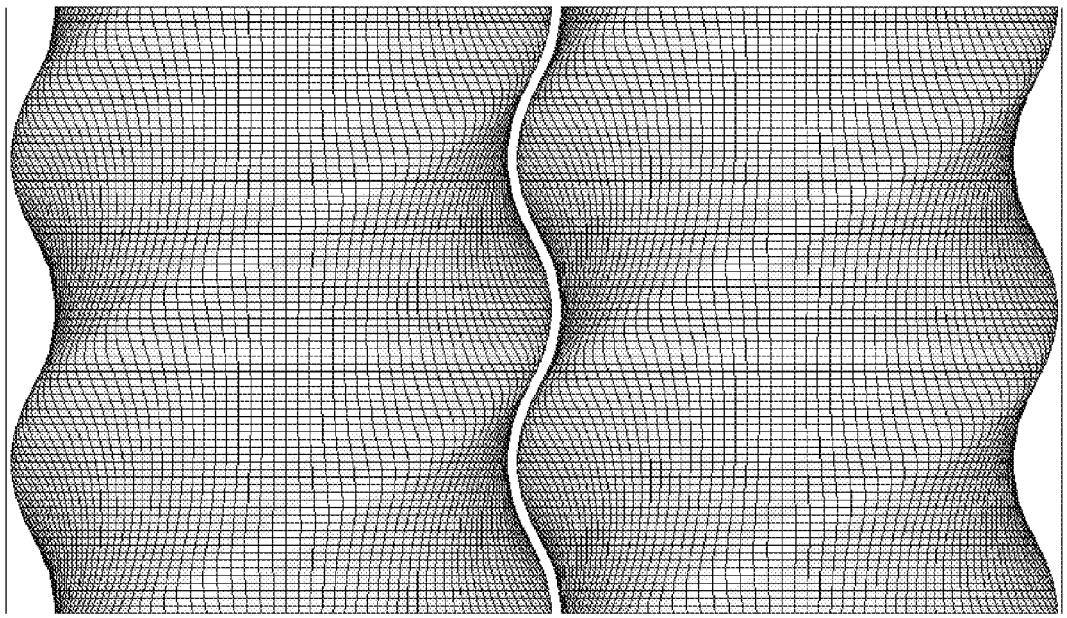
FIG. 10a shows three-flight profiles employed in the form of a continuous conveying thread.
Figure 10B:
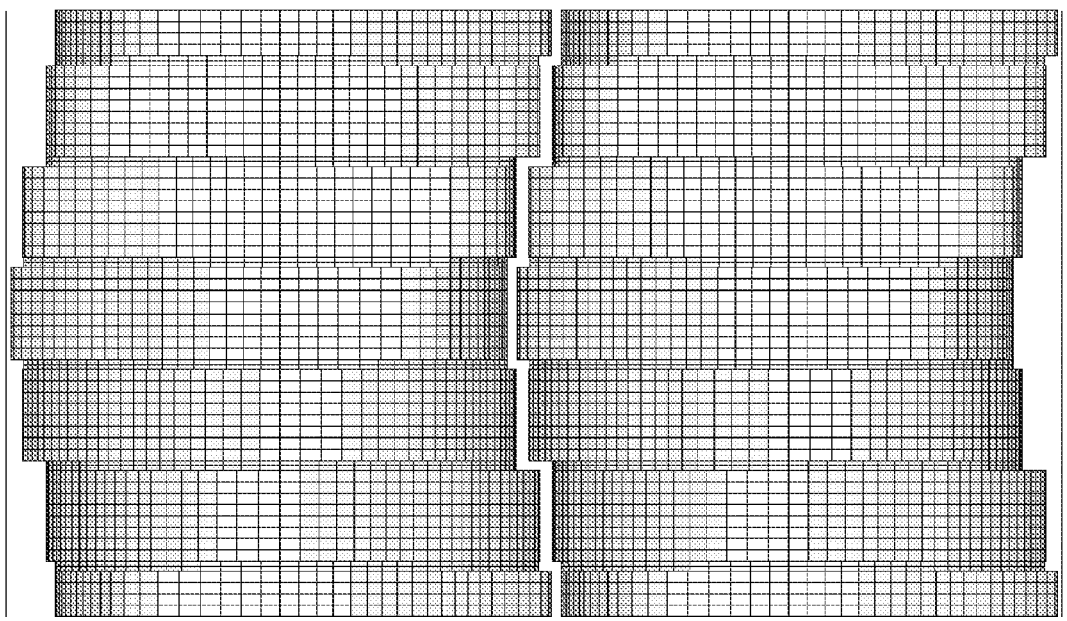
FIG. 10b shows three-flight profiles employed in the form of kneading discs.

Three-flight profiles can be employed according to the invention in the form of a continuous conveying thread according to FIG. 10a or in the form of kneading discs according to FIG. 10b.

Figure 11:
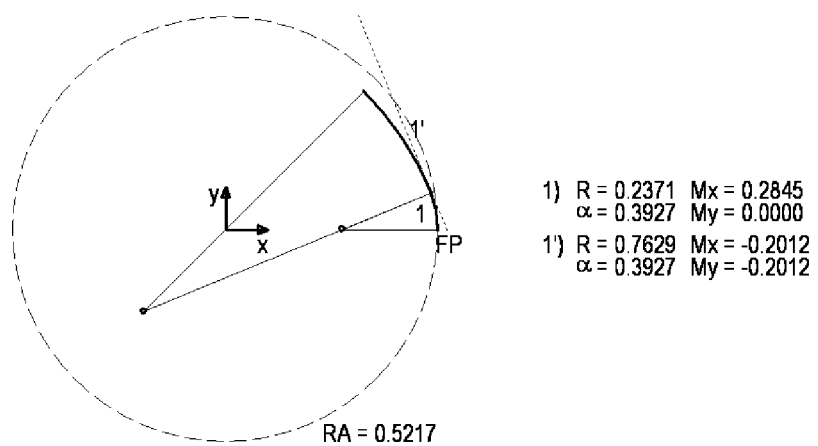
FIG. 11 shows a profile section of a four-flight screw element according to the invention which is composed of two segments of circles.

Axially symmetrical four-flight screw profiles are completely defined by a 45° section of the screw profile. FIG. 11 shows a profile section of a four-flight screw element according to the invention which is composed of two segments of circles. This construction is applied analogously to all ratios between the outer screw radius and the centre distance from 0.5 to 0.541.

The generation of eccentric profiles and the generation of gaps during wiping is similar to that used for two- and three-flight profiles and is not shown in the present case.

Figure 12A:
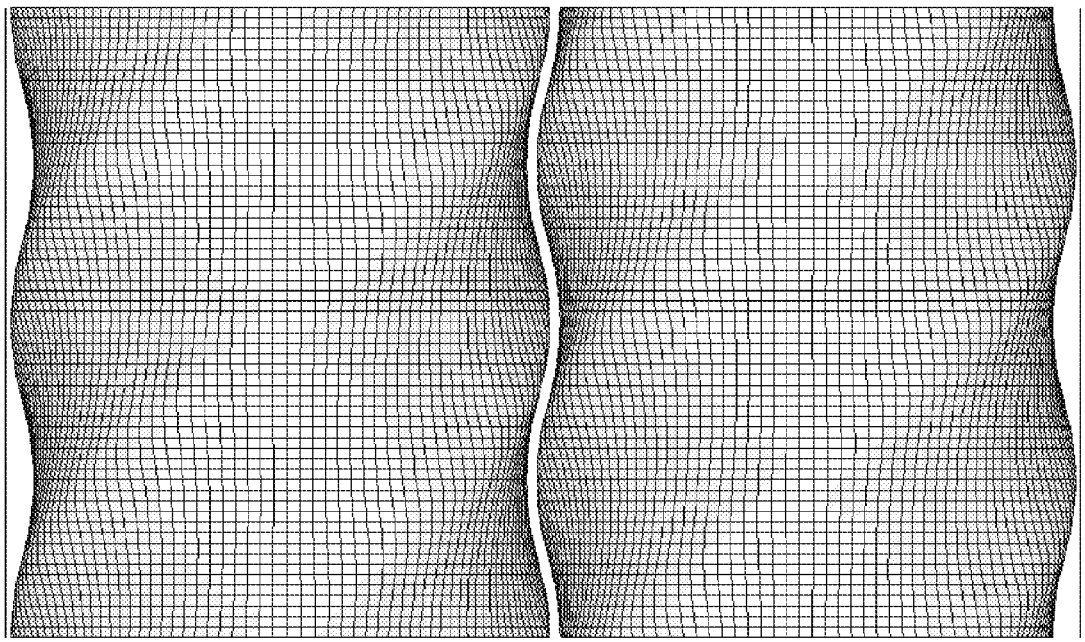
FIG. 12a shows the four-flight profiles in form of a continuous conveying thread.
Figure 12B:
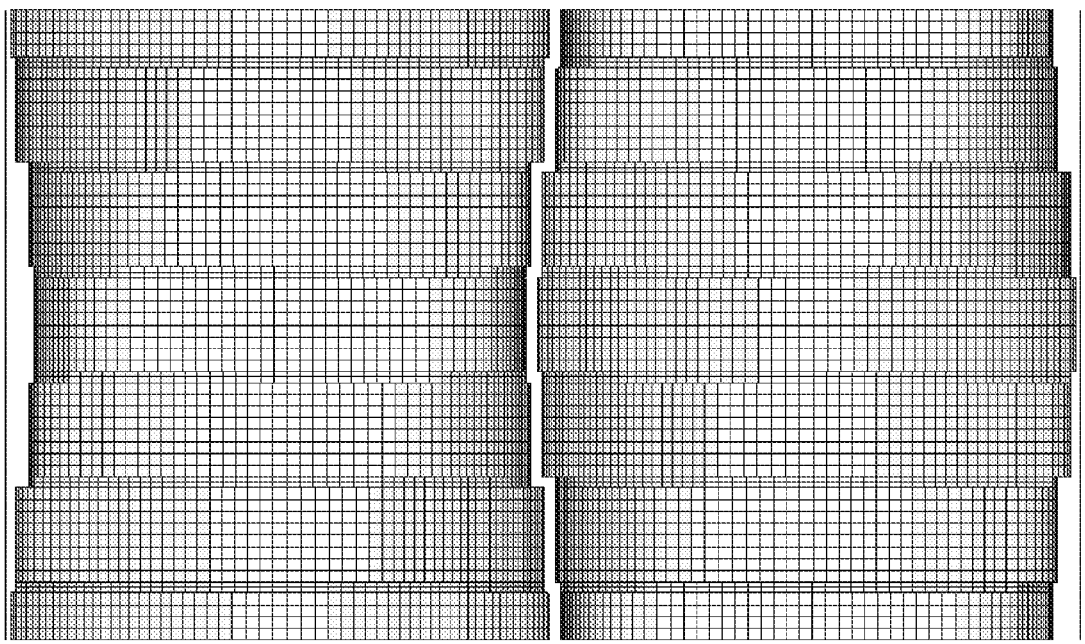
FIG. 12b shows the four flight profiles in form of a kneading discs.

The four-flight profiles can be used in the form of a continuous conveying thread according to FIG. 12a or in the form of kneading discs according to FIG. 12b.

Profiles according to the invention with more than four flights can be produced in an analogous manner. The gaps can be varied and eccentric profiles generated in an analogous manner.

Figure 13A:
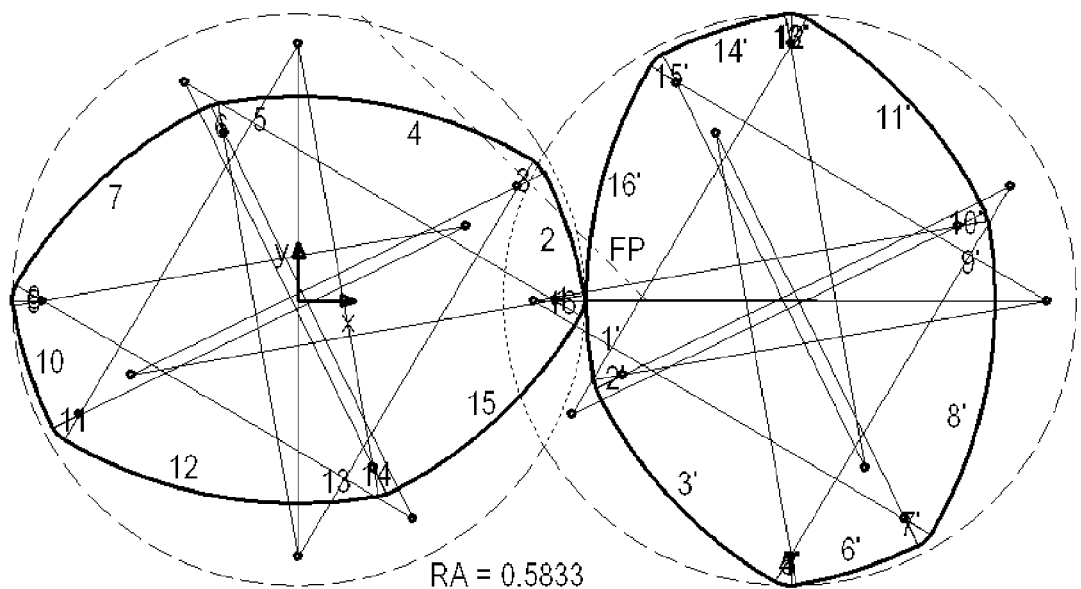
FIG. 13a depicts a cross-sectional diagrammatic example of a pair of screw elements.

FIG. 13a depicts a cross-sectional diagrammatic example of a pair of screw elements according to the invention. The generating screw profile is depicted by the screw profile on the left. The generated screw profile is depicted by the screw profile on the right. Both screw profiles consist of 16 arcs. The arcs of the generating and the generated screw profiles are depicted by thick, continuous lines labelled with the respective arc numbers. The centre points of the arcs are depicted by means of small circles. The centre points of the arcs are connected by thin, continuous lines (boundary lines) to their respective starting and end points. The outer screw radius is the same both for the generating and the generated screw profile. The outer screw radius is depicted by a thin broken line in the region of the screw barrel and by a thin dotted line in the intermeshing zone. Due to the large number of arcs and the generation of the figures by means of a computer program the numbering of individual arcs in some cases overlaps the boundary lines and is therefore difficult to read. Despite the poor legibility of some of the numbers the construction of the profiles is however still clear from the context in conjunction with the present description and the coordinate values in FIG. 13b.

The pair of screw profiles according to the invention shown in FIG. 13a is dot-symmetrical but not axially symmetrical. The straight line FP (shown as a dash-dotted line) does not form a tangent on the arcs. Such a screw element provides particularly high degrees of freedom for the dispersing effect, since the regions upstream and downstream of the tips, which are crucial for the dispersing effect, can be adapted precisely to suit the task at hand without having to make allowances for the geometrical restriction imposed by straight line FP. FIG. 13b lists the x- and y-coordinates of the centre points (Mx and My), the radii R and the angles α of all of the arcs of FIG. 13a. The angles are stated in terms of radian measurement; all of the other dimensions are normalized in relation to the centre distance and are therefore dimensionless.

The invention claimed is:

1. Screw elements for multiscrew extruders with screws co-rotating in pairs and being fully self-wiping in pairs, wherein the screws comprise screw profiles and sections, and having two or more flights, wherein the screw profiles have continuously differentiable profile contours over the entire cross-sections and comprise at least a generating screw profile and a generated screw profile, wherein each screw profile of the screw profiles is composed of four or more arcs over the entire cross-section that merge tangentially into each other at starting and end points of each arc, and wherein the centre distance between the generating screw profile and the generated screw profile is a the number of arcs of the generating screw profile is n, the outer radius ra of the generating screw profile is greater than 0 (ra>0) and smaller than the centre distance (ra<a), the inner radius ri of the generating screw profile is greater than 0 (ri>0) and smaller than or equal to ra (ri≤ra), all of the arcs of the generating screw profile merge tangentially into each other, the arcs form a closed screw profile, i.e. the sum of the angles $\alpha_j$ of all of the arcs j is $2\pi$, wherein $\pi$ is pi ($\pi \approx 3.14159$), the arcs form a convex screw profile, all of the arcs of the generating screw profile are located between and/or on the boundary rings of an annulus which has an outer radius ra and an inner radius ri and whose centre point is located at the point of rotation of the generating screw profile, at least one of the arcs of the generating screw profile touches the outer radius ra of the generating screw profile at point $P_A$, at least one of the arcs of the generating screw profile touches the inner radius ri of the generating screw profile at point $P_I$, the number of arcs n' of the generated screw profile is the same as the number of arcs n of the generating screw profile, the outer radius ra' of the generated screw profile equals the difference between the centre distance and the inner radius ri of the generating screw profile (ra'=a−ri), the inner radius ri' of the generated screw profile equals the difference between the centre distance and the outer radius ra of the generating screw profile (ri'=a−ra), the angle $\alpha_{j'}$ of the j'th arc of the generated screw profile is the same as the angle $\alpha_j$ of the jth arc of the generating screw profile, wherein j is an index which represents all integers in the range from 1 to the number of arcs n and j' is an index which represents all integers in the range from 1 to the number of arcs n', the sum of the radius $r_{j'}$' of the j'th arc of the generated screw profile and the radius $r_j$ of the jth arc of the generating screw profile is the same as the centre distance a, wherein j is an index which represents all integers in the range from 1 to the number of arcs n and j' is an index which represents all integers in the range from 1 to the number of arcs n', the distance between the centre point of the j'th arc of the generated screw profile and the centre point of the jth arc of the generating screw profile is the same as the centre distance a and the distance between the centre point of the j'th arc of the generated screw profile and the point of rotation of the generated screw profile is the same as the distance between the centre point of the jth arc of the generating screw profile and the point of rotation of the generating screw profile, and the connecting line between the centre point of the j'th arc of the generated screw profile and the centre point of the jth arc of the generating screw profile is a line parallel to the connecting line between the point of rotation of the generated screw profile and the point of rotation of the generating screw profile, wherein j is an index which represents all integers in the range from 1 to the number of arcs n and j' is an index which represents all integers in the range from 1 to the number of arcs n', the starting point of the j'th arc of the generated screw profile lies in an opposite direction, in relation to the centre point of the j'th arc of the generated screw profile, to that of the starting point of the jth arc of the generating screw profile in relation to the centre point of the jth arc of the generating screw profile, wherein j is an index which represents all integers in the range from 1 to the number of arcs n and j' is an index which represents all integers in the range from 1 to the number of arcs n', and wherein at least one screw profile, selected from the generating screw profile and the generated screw profile, comprises a first arc and a second arc, wherein a center point of the first arc is located on a line segment that extends from a center point of the second arc to a rightmost end point of the second arc, both the first arc and the second arc share a common line segment that extends from the center point of the first arc to the rightmost end point of the second arc and a leftmost end point of the first arc, a leftmost end point of the second arc is located at a point that corresponds to an inner radius of the screw profile, and a rightmost end point of the first arc is located at a point that corresponds to an outer radius of the screw profile, wherein both the center point of the first arc and the center point of the second arc are located within a circle having a radius equal to the outer radius of the screw profile and having a center point corresponding to the point of rotation D, and wherein the center point of the first arc is located on a line segment, which starts at the point of rotation D and ends at the point that corresponds to the outer radius of the screw profile, and wherein the center point of the second arc is located on a line segment, which starts at the point of rotation D and ends at the point that corresponds to the inner radius of the screw profile.

2. The screw elements according to claim 1, wherein the screw elements are dot-symmetrical and the profile contour in a segment of 360°/(2·Z) is composed of at least two arcs, wherein Z is the number of flights of the screw elements.

3. The screw elements according to claim 1, wherein the screw elements are axially symmetrical and the profile contour in a segment of 360°/(2·Z) is composed of at least two arcs, wherein Z is the number of flights of the screw elements.

4. The screw elements according to claim 3, wherein the profile contour in a section is composed of two arcs which merge into each other in a continuously differentiable manner at point $P_{FP}$, wherein point $P_{FP}$ is located on a straight line FP and the perpendicular to FP at point $P_{FP}$ passes through the centre points of the two arcs.

5. The screw elements according to claim 4, wherein the screw elements have a point of rotation D, a point $P_A$ which is located on a circle around the point of rotation having the outer radius ra of the screw element, a point $P_I$ which is located on a circle around the point of rotation having the inner radius $r_I$ of the screw element, a straight line $DP_A$ which passes through points $P_A$ and D and a straight line $DP_I$ which passes through points $P_I$ and D, and which, using a Cartesian coordinate system with point D at its origin and point $P_A$ on its x-axis, are characterized in that a vertical line intersects straight line $DP_A$ at the centre point of one of the arcs and the straight line passing through points D and PI intersects the centre point of the other arc, and in that the straight line FP is located at a distance from the point of rotation which corresponds to half the centre distance a and has a gradient, in terms of radian measurement, of $-1/\tan(\pi/(2\cdot Z))$.

6. The screw elements according to claim 1, wherein the screw elements are designed in the form of mixing elements or conveying elements.

7. The screw elements according to claim 1, wherein the screw elements are designed in the form of kneading elements.

8. The screw elements according to claim 1, wherein only a single point on the outer radius ra of the generating screw profile wipes a barrel.

9. The screw element according to claim 1, wherein only one of two tips of each screw fully wipes a barrel.

10. The screw element according to claim 1, wherein the screws completely wipe each other and only two tips of three tips of each screw wipe a barrel.

11. The screw element according to claim 1, wherein the screw profiles are shifted within clearances.

12. The screw element according to claim 11, wherein the screw profiles are shifted within the clearances at an angle greater than 0° and no more than 90°.

13. The screw element according to claim 1, wherein clearances in a range of 0.1 to 0.001, relative to an outer radius ra of a generating screw profile, are present between at least one of (i) screw elements and a barrel and (ii) adjacent screw elements.

14. A method of using screw elements in a multi-screw extruder, the method comprising providing screw elements including pairs of co-rotating, fully wiping extruder screws according to claim 1, and using the screw elements for conveying, kneading or mixing.

15. The method according to claim 14, wherein the pairs of screw elements wipe each other with a constant intermediate gap over entire peripheries of the pairs of screw elements.

16. The method according to claim 14, wherein the pairs of screw elements wipe each other with an intermediate gap that is not constant over entire peripheries of the pairs of screw elements.

17. The method according to claim 14, wherein the profiles of the pairs of screw elements are shifted in relation to the point of rotation located at a center of a barrel bore.

18. A method of generating screw profiles of screw elements for multi-screw extruders having pairs of co-rotating and fully wiping screws, wherein the screw profiles have continuously differentiable contours with a centre distance a and two or more flights, wherein entire cross-sections of the screw profiles consist of n/n' arcs, wherein n/n' is an integer which is greater than or equal to 2, n is the number of arcs of a generating screw profile, and n' is the number of arcs of a generated screw profile, and further wherein, in a first step,
the outer radius ra of the generating screw profile is selected in such a way that the outer radius ra is greater than 0 (ra>0) and smaller than the centre distance (ra<a),
the inner radius ri of the generating screw profile is selected in such a way that the inner radius ri is greater than 0 (ri>0) and smaller than or equal to ra (ri≤ra), and, in a second step,
the arcs are arranged in succession by determining their position and size in such a manner that all of the arcs of the generating screw profile merge tangentially into each other, the arcs form a closed, convex screw profile, all of the arcs of the generating screw profile are located between and/or on the boundary rings (circles) of an annulus which has an outer radius ra and an inner radius ri, whose centre points are positioned at the point of rotation of the generating screw profile, at least one of the arcs of the generating screw profile touches the outer radius ra of the generating screw profile at point PA and at least one of the arcs of the generating screw profile touches the inner radius ri of the generating screw profile at point PI, wherein the n' arcs of the generated screw profile are based on the n arcs of the generating screw profile such that
the number of arcs n' of the generated screw profile is identical to the number of arcs n of the generating screw profile,
the outer radius ra' of the generated screw profile equals the difference between the centre distance a and the inner radius ri of the generating screw profile (ra'=a−ri),
the inner radius ri' of the generated screw profile equals the difference between the centre distance a and the outer radius ra of the generating screw profile (ri'=a−ra),
angle aj' of the j'th arc of the generated screw profile is the same as angle aj of the jth arc of the generating screw profile, wherein j is an index which represents all integers in the range from 1 to the number of arcs n and j' is an index which represents all integers in the range from 1 to the number of arcs n',
the sum of radius rj' of the j'th arc of the generated screw profile and radius rj of the jth arc of the generating screw profile equals the centre distance a, wherein j is an index which represents all integers in the range from 1 to the number of arcs n and j' is an index which represents all integers in the range from 1 to the number of arcs n', wherein rj is the radius of the jth arc of the generating screw profile,
the distance between the centre point of the j'th arc of the generated screw profile and the centre point of the jth arc of the generating screw profile equals the centre distance a and the distance between the centre point of the j'th arc of the generated screw profile and the point of rotation of the generated screw profile is the same as the distance between the centre point of the jth arc of the generating screw profile and the point of rotation of the generating screw profile, and the connecting line between the centre point of the j'th arc of the generated screw profile and the centre point of the jth arc of the generating screw profile is a line parallel to the connecting line between the point of rotation of the generated screw profile and the point of rotation of the generating screw profile, wherein j is an index which represents all integers in the range from 1 to the number of arcs n and j' is an index which represents all integers in the range from 1 to the number of arcs n', and the starting point of the j'th arc of the generated screw profile lies in an opposite direction in relation to the centre point of the j'th arc of the generated screw profile, to that of the starting point of the jth arc of the generating screw profile in relation to the centre point of the jth arc of the generating screw profile, wherein j is an index which represents all integers in the range from 1 to the number of arcs n and j' is an index which represents all integers in the range from 1 to the number of arcs n' and wherein at least one screw profile, selected from the generating screw profile and the generated screw profile, comprises a first arc, a second arc and a third arc, wherein
a center point of the first arc is located on a line segment that extends from a center point of the second arc to a rightmost end point of the second arc,
both the first arc and the second arc share a common line segment that extends from the center point of the first arc to the rightmost end point of the second arc and a leftmost end point of the first arc,
a center point of the second arc is located on a line segment that extends from a center point of the third arc to a rightmost end point of the third arc,
both the second arc and the third arc share a common line segment that extends from the center point of the second arc to the rightmost end point of the third arc and a leftmost end point of the second arc,
a leftmost end point of the third arc is located at a point that corresponds to an inner radius of the screw profile, and
a rightmost end point of the first arc is located at a point that corresponds to an outer radius of the screw profile.

19. The method according to claim 18, wherein the tangential transition between the jth and the (j+1)th arc of the generating screw profile is constructed by forming a circle with a radius rj+1 around the end point of the jth arc, and that point of intersection between this circle and a straight line through the centre point and the end point of the jth arc which is located nearer the point of rotation of the generating screw profile is the centre point of the (j+1)th arc.

20. The method according to claim 18, wherein the method is carried out by a computer system.

21. The method according to claim 20, wherein the entire screw elements are constructed virtually in a computer and the construction results are fed to a milling machine for producing the screw elements.

22. Screw elements for multiscrew extruders with screws co-rotating in pairs and being fully self-wiping in pairs, wherein the screws comprise screw profiles and sections, and having two or more flights, wherein the screw profiles have continuously differentiable profile contours over the entire cross-sections and comprise at least a generating screw profile and a generated screw profile, wherein each screw profile of the screw profiles is composed of four or more arcs over the entire cross-section that merge tangentially into each other at starting and end points of each arc, and wherein the centre distance between the generating screw profile and the generated screw profile is a the number of arcs of the generating screw profile is n, the outer radius ra of the generating screw profile is greater than 0 (ra>0) and smaller than the centre distance (ra<a), the inner radius ri of the generating screw profile is greater than 0 (ri>0) and smaller than or equal to ra (ri≤ra), all of the arcs of the generating screw profile merge tangentially into each other, the arcs form a closed screw profile, i.e. the sum of the angles $\alpha_j$ of all of the arcs j is $2\pi$, wherein $\pi$ is pi ($\pi \approx 3.14159$), the arcs form a convex screw profile, all of the arcs of the generating screw profile are located between and/or on the boundary rings of an annulus which has an outer radius ra and an inner radius ri and whose centre point is located at the point of rotation of the generating screw profile, at least one of the arcs of the generating screw profile touches the outer radius ra of the generating screw profile at point $P_A$, at least one of the arcs of the generating screw profile touches the inner radius ri of the generating screw profile at point $P_I$, the number of arcs n' of the generated screw profile is the same as the number of arcs n of the generating screw profile, the outer radius ra' of the generated screw profile equals the difference between the centre distance and the inner radius ri of the generating screw profile (ra'=a−ri), the inner radius ri' of the generated screw profile equals the difference between the centre distance and the outer radius ra of the generating screw profile (ri'=a−ra), the angle $\alpha_{j'}'$ of the j'th arc of the generated screw profile is the same as the angle $\alpha_j$ of the jth arc of the generating screw profile, wherein j is an index which represents all integers in the range from 1 to the number of arcs n and j' is an index which represents all integers in the range from 1 to the number of arcs n', the sum of the radius $r_{j'}'$ of the j'th arc of the generated screw profile and the radius $r_j$ of the jth arc of the generating screw profile is the same as the centre distance a, wherein j is an index which represents all integers in the range from 1 to the number of arcs n and j' is an index which represents all integers in the range from 1 to the number of arcs n', the distance between the centre point of the j'th arc of the generated screw profile and the centre point of the jth arc of the generating screw profile is the same as the centre distance a and the distance between the centre point of the j'th arc of the generated screw profile and the point of rotation of the generated screw profile is the same as the distance between the centre point of the jth arc of the generating screw profile and the point of rotation of the generating screw profile, and the connecting line between the centre point of the j'th arc of the generated screw profile and the centre point of the jth arc of the generating screw profile is a line parallel to the connecting line between the point of rotation of the generated screw profile and the point of rotation of the generating screw profile, wherein j is an index which represents all integers in the range from 1 to the number of arcs n and j' is an index which represents all integers in the range from 1 to the number of arcs n', the starting point of the j'th arc of the generated screw profile lies in an opposite direction, in relation to the centre point of the j'th arc of the generated screw profile, to that of the starting point of the jth arc of the generating screw profile in relation to the centre point of the jth arc of the generating screw profile, wherein j is an index which represents all integers in the range from 1 to the number of arcs n and j' is an index which represents all integers in the range from 1 to the number of arcs n', and wherein at least one screw profile, selected from the generating screw profile and the generated screw profile, comprises a first arc, a second arc and a third arc, wherein a center point of the first arc is located on a line segment that extends from a center point of the second arc to a rightmost end point of the second arc, both the first arc and the second arc share a common line segment that extends from the center point of the first arc to the rightmost end point of the second arc and a leftmost end point of the first arc, a center point of the second arc is located on a line segment that extends from a center point of the third arc to a rightmost end point of the third arc, both the second arc and the third arc share a common line segment that extends from the center point of the second arc to the rightmost end point of the third arc and a leftmost end point of the second arc, a leftmost end point of the third arc is located at a point that corresponds to an inner radius of the screw profile, and a rightmost end point of the first arc is located at a point that corresponds to an outer radius of the screw profile.

23. The screw element according to claim 22, wherein the center points of the first arc, the center point of the second arc, and the center point of the third arc are located within a circle having a radius equal to the outer radius of the screw profile and having a center point corresponding to the point of rotation D.

24. The screw element according to claim 22, wherein the center point of the first arc is located on a line segment, which starts at the point of rotation D and ends at the point that corresponds to the outer radius of the screw profile, and wherein the center point of the third arc is located on a line segment, which starts at the point of rotation D and ends at the point that corresponds to the inner radius of the screw profile.

25. A method of generating screw profiles of screw elements for multi-screw extruders having pairs of co-rotating and fully wiping screws, wherein the screw profiles have continuously differentiable contours with a centre distance a and two or more flights, wherein entire cross-sections of the screw profiles consist of n/n' arcs, wherein n/n' is an integer which is greater than or equal to 2, n is the number of arcs of a generating screw profile, and n' is the number of arcs of a generated screw profile, and further wherein, in a first step, the outer radius ra of the generating screw profile is selected in such a way that the outer radius ra is greater than 0 (ra>0) and smaller than the centre distance (ra<a), the inner radius ri of the generating screw profile is selected in such a way that the inner radius ri is greater than 0 (ri>0) and smaller than or equal to ra (ri≤ra), and, in a second step, the arcs are arranged in succession by determining their position and size in such a manner that all of the arcs of the generating screw profile merge tangentially into each other, the arcs form a closed, convex screw profile, all of the arcs of the generating screw profile are located between and/or on the boundary rings (circles) of an annulus which has an outer radius ra and an inner radius ri, whose centre points are positioned at the point of rotation of the generating screw profile, at least one of the arcs of the generating screw profile touches the outer radius ra of the generating screw profile at point PA and at least one of the arcs of the generating screw profile touches the inner radius ri of the generating screw profile at point PI, wherein the n' arcs of the generated screw profile are based on the n arcs of the generating screw profile such that
- the number of arcs n' of the generated screw profile is identical to the number of arcs n of the generating screw profile,
- the outer radius ra' of the generated screw profile equals the difference between the centre distance a and the inner radius ri of the generating screw profile (ra'=a-ri),
- the inner radius ri' of the generated screw profile equals the difference between the centre distance a and the outer radius ra of the generating screw profile (ri'=a-ra),
- angle aj' of the j'th arc of the generated screw profile is the same as angle aj of the jth arc of the generating screw profile, wherein j is an index which represents all integers in the range from 1 to the number of arcs n and j' is an index which represents all integers in the range from 1 to the number of arcs n',
- the sum of radius rj' of the j'th arc of the generated screw profile and radius rj of the jth arc of the generating screw profile equals the centre distance a, wherein j is an index which represents all integers in the range from 1 to the number of arcs n and j' is an index which represents all integers in the range from 1 to the number of arcs n', wherein rj is the radius of the jth arc of the generating screw profile,
- the distance between the centre point of the j'th arc of the generated screw profile and the centre point of the jth arc of the generating screw profile equals the centre distance a and the distance between the centre point of the j'th arc of the generated screw profile and the point of rotation of the generated screw profile is the same as the distance between the centre point of the jth arc of the generating screw profile and the point of rotation of the generating screw profile, and the connecting line between the centre point of the j'th arc of the generated screw profile and the centre point of the jth arc of the generating screw profile is a line parallel to the connecting line between the point of rotation of the generated screw profile and the point of rotation of the generating screw profile, wherein j is an index which represents all integers in the range from 1 to the number of arcs n and j' is an index which represents all integers in the range from 1 to the number of arcs n', and the starting point of the j'th arc of the generated screw profile lies in an opposite direction in relation to the centre point of the j'th arc of the generated screw profile, to that of the starting point of the jth arc of the generating screw profile in relation to the centre point of the jth arc of the generating screw profile, wherein j is an index which represents all integers in the range from 1 to the number of arcs n and j' is an index which represents all integers in the range from 1 to the number of arcs n', and wherein at least one screw profile, selected from the generating screw profile and the generated screw profile, comprises a first arc and a second arc, wherein
- a center point of the first arc is located on a line segment that extends from a center point of the second arc to a rightmost end point of the second arc,
- both the first arc and the second arc share a common line segment that extends from the center point of the first arc to the rightmost end point of the second arc and a leftmost end point of the first arc,
- a leftmost end point of the second arc is located at a point that corresponds to an inner radius of the screw profile, and
- a rightmost end point of the first arc is located at a point that corresponds to an outer radius of the screw profile,
- wherein both the center point of the first arc and the center point of the second arc are located within a circle having a radius equal to the outer radius of the screw profile and having a center point corresponding to the point of rotation D, and
- wherein the center point of the first arc is located on a line segment, which starts at the point of rotation D and ends at the point that corresponds to the outer radius of the screw profile, and wherein the center point of the second arc is located on a line segment, which starts at the point of rotation D and ends at the point that corresponds to the inner radius of the screw profile.

* * * * *